(12) United States Patent
Jeong et al.

(10) Patent No.: US 11,500,146 B2
(45) Date of Patent: Nov. 15, 2022

(54) BACKLIGHT UNIT AND DISPLAY DEVICE HAVING THE SAME

(71) Applicant: SAMSUNG DISPLAY CO., LTD., Yongin-si (KR)

(72) Inventors: Wee Joon Jeong, Yongin-si (KR); Sang Woon Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 69 days.

(21) Appl. No.: 16/453,255

(22) Filed: Jun. 26, 2019

(65) Prior Publication Data

US 2020/0073047 A1 Mar. 5, 2020

(30) Foreign Application Priority Data

Aug. 28, 2018 (KR) .................. 10-2018-0101574

(51) Int. Cl.
*F21V 8/00* (2006.01)

(52) U.S. Cl.
CPC .......... *G02B 6/0068* (2013.01); *G02B 6/005* (2013.01); *G02B 6/0083* (2013.01)

(58) Field of Classification Search
CPC .... G02B 6/0068; G02B 6/0083; G02B 6/005; G02B 6/009; G02B 6/0041; G02B 6/0073; G02B 6/0091; G02F 1/133615
See application file for complete search history.

(56) References Cited

U.S. PATENT DOCUMENTS

| 9,618,681 | B2 | 4/2017 | Cheng et al. | |
|---|---|---|---|---|
| 2009/0115711 | A1* | 5/2009 | Ueyama | G02B 6/0068 345/87 |
| 2010/0053955 | A1* | 3/2010 | Vissenberg | G02B 6/0068 362/235 |
| 2012/0320581 | A1* | 12/2012 | Rogers | H01L 24/24 362/235 |
| 2015/0331171 | A1* | 11/2015 | Jia | G02B 6/009 362/609 |

(Continued)

FOREIGN PATENT DOCUMENTS

| CN | 202598330 U | * 12/2012 | ............... F21S 8/00 |
|---|---|---|---|
| JP | 6389570 | 8/2018 | |
| KR | 10-1744871 | 6/2017 | |

(Continued)

*Primary Examiner* — Donald L Raleigh
(74) *Attorney, Agent, or Firm* — F. Chau & Associates, LLC

(57) ABSTRACT

A backlight unit is described. The unit includes a light emitting array having a plurality of light sources configured to emit light, and a printed circuit board on which the light sources are arranged; a light guide film configured to guide light emitted from the light sources in one direction; a color conversion layer configured to convert light that has passed through the light guide film into light of a specific color; and an optical member disposed on the color conversion layer. The light sources include first light sources arranged on a first row of the printed circuit board, and second light sources arranged on a second row of the printed circuit board. The first light sources are spaced apart from each other by a predetermined distance, and the second light sources are spaced apart from each other by the predetermined distance.

17 Claims, 12 Drawing Sheets

(56) References Cited

U.S. PATENT DOCUMENTS

2018/0059310 A1\* 3/2018 Bae .................. G02F 1/136286
2018/0097033 A1 4/2018 Ahmed et al.

FOREIGN PATENT DOCUMENTS

| KR | 10-1789123 | 10/2017 | | |
|---|---|---|---|---|
| KR | 10-2017-0133757 | 12/2017 | | |
| KR | 10-2018-0003353 | 1/2018 | | |
| WO | WO-2013143158 A1 \* | 10/2013 | ........... | G02B 6/0068 |

\* cited by examiner

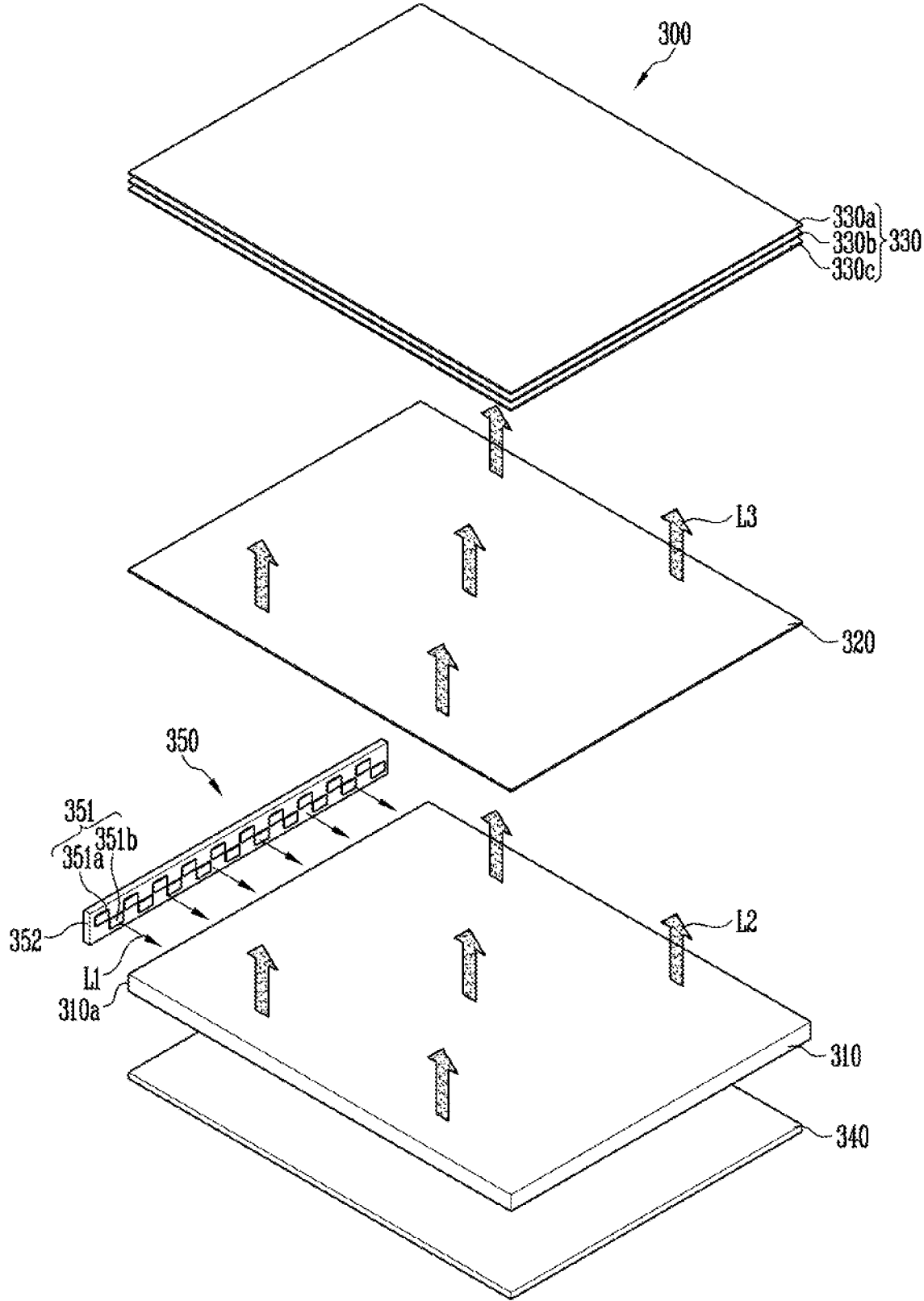

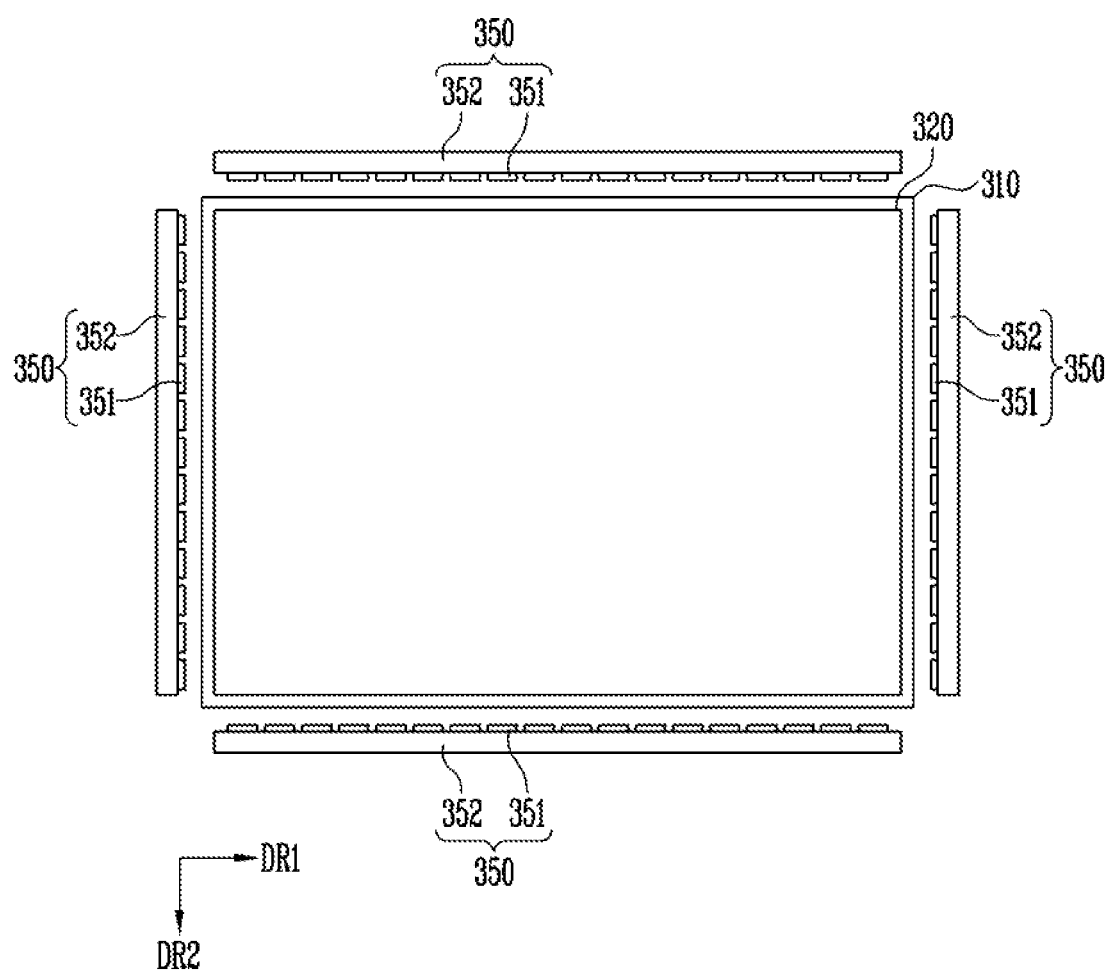

BACKLIGHT UNIT AND DISPLAY DEVICE HAVING THE SAME

CROSS-REFERENCE TO RELATED APPLICATION

The present application claims priority to Korean patent application number 10-2018-0101574 filed on Aug. 28, 2018, the entire disclosure of which is incorporated herein in its entirety by reference.

FIELD OF DISCLOSURE

Various embodiments of the present disclosure relate to a backlight unit and a display device having the backlight unit.

DESCRIPTION OF RELATED ART

Some display devices utilize a backlight unit capable of generating light to display an image. The backlight unit supplies light to a display panel including liquid crystals and the like, and includes a light source and a light guide film for guiding light emitted from the light source to the display panel.

In a display device having a narrow bezel, a plurality of light sources may be near to, or in close contact with, a side of the light guide film. If the distance between the light sources and the light guide film is small, a relatively bright zone may be formed at points on the side of the light guide film where the light sources are formed, and a relatively dark zone may be formed at an area between the light sources. A brightness difference between the bright zone and the dark zone may lead to a hot spot defect.

In order to accomplish slimming of the display device, a thinner light guide film may be applied to the backlight unit. In this case, the size of the light sources may be larger than the thickness of the light guide film, so that light leakage defect may occur. Namely, light emitted from each of the light sources may not be completely incident on the light guide film but may leak out of the light guide film. This may result in a defect which may deteriorate the quality of the display device.

SUMMARY

Various embodiments of the present disclosure are directed to a backlight unit and a display device having the backlight unit, wherein the backlight unit is capable of improving the reliability of a product while preventing both a light leakage defect and a hot spot defect.

One embodiment of the present disclosure provides a backlight unit including: a light emitting array including a plurality of light sources configured to emit light, and a printed circuit board on which the light sources are arranged; a light guide film configured to guide light emitted from the light sources in one direction; a color conversion layer configured to convert light that has passed through the light guide film into light of a specific color; and an optical member provided on the color conversion layer. The light sources may include a plurality of first light sources arranged on a first row of the printed circuit board, and a plurality of second light sources arranged on a second row of the printed circuit board. The first light sources may be spaced apart from each other by a predetermined distance, and the second light sources may be spaced apart from each other by a predetermined distance.

The first light sources may be the same as the second light sources.

The first light sources and the second light sources may be alternately arranged on the printed circuit board.

The light emitting array may include a plurality of unit light emitting areas each having at least one of the first light sources and at least one of the second light sources.

The at least one first light source and the at least one second light source included in each of the unit light emitting areas may be electrically connected via an interconnection line arranged on the printed circuit board.

The light sources may further include a plurality of third light sources arranged on a third row of the printed circuit board.

The first light sources and the third light sources may be arranged on the same column on the printed circuit board.

The first light sources, the second light sources, and the third light sources may be arranged on different columns on the printed circuit board.

The first light sources, the second light sources, and the third light sources may be alternately arranged on the printed circuit board.

The light source may further include a plurality of fourth light sources arranged on a fourth row of the printed circuit board.

The first light sources and the second light sources may be arranged on the same column, and the third light sources and the fourth light sources may be arranged on the same column.

The first light sources and the third light sources may be arranged on the same column, and the second light sources and the fourth light sources may be arranged on the same column.

Each of the first light sources and second light sources may include a micro-scale light emitting element having a size of about 300 rpm or less. The light emitting element may include a light-emitting diode configured to emit blue light.

The color conversion layer may include a light conversion layer containing a plurality of light conversion particles therein; a first protective layer disposed between the light conversion layer and the light guide film; and a second protective layer disposed between the light conversion layer and the optical member. Here, the light conversion particles may include a quantum dot.

The present disclosure provides a display device including a display panel configured to display an image; and a backlight unit configured to provide light for displaying the image to the display panel.

The backlight unit may include a light emitting array having a plurality of light sources configured to emit light, and a printed circuit board on which the light sources are arranged; a light guide film configured to guide light emitted from the light sources to the display panel; and a color conversion layer configured to convert light that has passed through the light guide film into light of a specific color.

The light sources may include a plurality of first light sources arranged on a first row of the printed circuit board, and a plurality of second light sources arranged on a second row of the printed circuit board.

The first light sources may be spaced apart from each other by a predetermined distance, and the second light sources may be spaced apart from each other by a predetermined distance.

Embodiments of the present disclosure provide a backlight unit and a display device having the backlight unit, which realize slimming and minimize defects, thus improving the reliability of a product.

BRIEF DESCRIPTION OF THE DRAWINGS

FIG. 7 is an exploded perspective view illustrating a backlight unit of FIG. 1 according to an embodiment of the present disclosure.

FIG. 9 is a plan view schematically illustrating a state in which the light emitting array of FIG. 7 is applied to all four sides of the light guide film according to an embodiment of the present disclosure.

DETAILED DESCRIPTION

Figure 1:
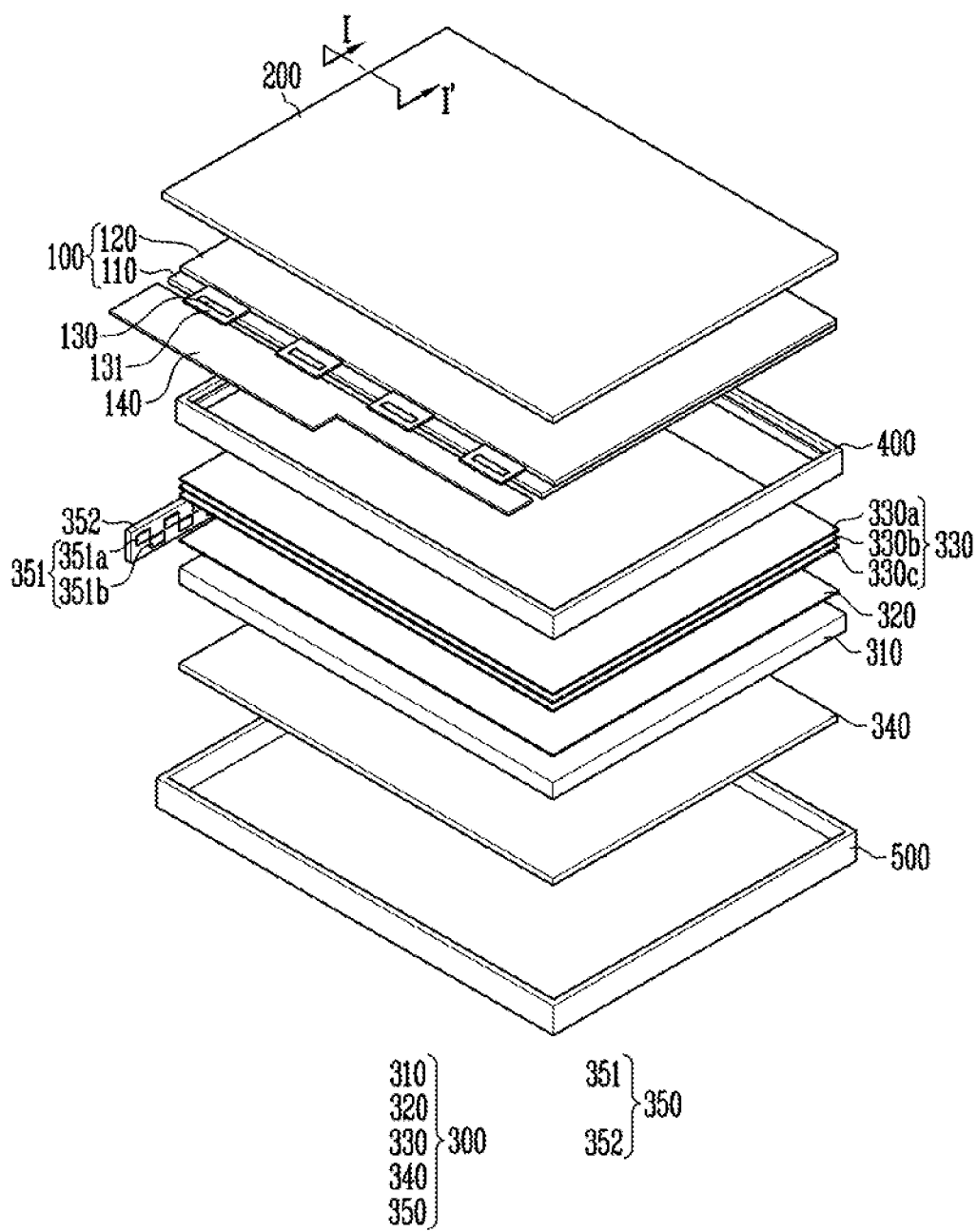
FIG. 1 is an exploded perspective view illustrating a display device according to an embodiment of the present disclosure.

Hereinafter, embodiments will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as "first" and "second" may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, "and/or" may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

Hereinafter, preferred embodiments of the present disclosure will be described in detail with reference to the accompanying drawings.

Figure 2:
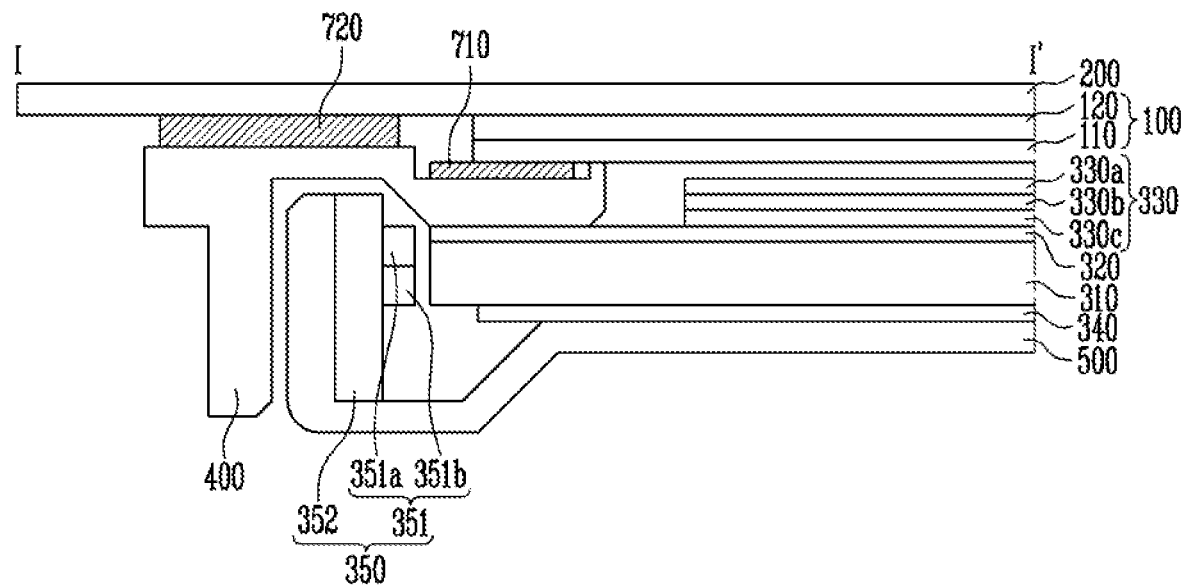
FIG. 2 is a sectional view taken along line I-I' of FIG. 1 according to an embodiment of the present disclosure.

FIG. 1 is an exploded perspective view illustrating a display device according to an embodiment of the present disclosure, and FIG. 2 is a sectional view taken along line I-I' of FIG. 1 according to an embodiment of the present disclosure.

Referring to FIGS. 1 and 2, the display device according to an embodiment of the present disclosure may include a display panel 100, a touch sensor 200, a backlight unit 300, a mold frame 400, and a housing 500.

The display panel 100 may have various shapes. For example, the display panel 100 may have a closed polygonal shape including straight sides. Further, the display panel 100 may have a circular or elliptical shape including curved sides. The display panel 100 may have a semi-circular or semi-elliptical shape including straight and curved sides. When the display panel 100 has straight sides, at least some of corners of each shape may be curved. For example, when the display panel 100 has a rectangular shape, a portion where adjacent straight sides meet may be replaced by a curve having a predetermined curvature.

According to an embodiment of the present disclosure, the display panel 100 may have a rectangular shape bounded by straight sides.

The display panel 100 may be one of an organic light-emitting display panel (OLED panel), a liquid crystal display panel (LCD panel), an electrophoretic display panel (EPD panel), and an electrowetting display panel (EWD panel). The organic light-emitting display panel is a self-luminous display panel, while the liquid crystal display panel, the electrophoretic display panel, and the electrowetting display panel are non-luminous display panels. If the display panel 100 is the organic light-emitting display panel, the backlight unit 300 may be omitted. According to an embodiment of the present disclosure, the display panel 100 may be a liquid crystal display panel or another display utilizing a backlight unit 300.

The display panel 100 may include a display area to display an image, and a non-display area disposed on at least a side of the display area.

The display panel 100 may include a first substrate 110, a second substrate 120 that faces the first substrate 110, and a liquid crystal layer (not shown) that is formed between the first substrate 110 and the second substrate 120. Polarizing films (not shown) may be provided on both sides of the display panel 100, namely, outer surfaces of the first substrate 110 and the second substrate 120.

A plurality of pixels (not shown) arranged in the form of a matrix may be provided in the display area of the first substrate 110. Each pixel may be provided with a gate line (not shown), a data line (not shown) that intersects with the gate line to be insulated therefrom, and a pixel electrode (not shown). Further, each pixel may be electrically connected to the gate line and the data line, and may be provided with a thin film transistor (not shown) that may be electrically connected to correspond to the pixel electrode. The thin film transistor may switch a driving signal provided to a corresponding pixel electrode side.

A sealing member (not shown) may be disposed in the non-display area of the first substrate 110 to join the first substrate 110 and the second substrate 120. The sealing member may be disposed in the non-display area along an edge of the display area.

On a surface of the second substrate 120, there may be provided a color filter (not shown) making a predetermined color using light supplied from the backlight unit 300 and a common electrode (not shown) formed on the color filter to face the pixel electrode. Here, the color filter may have any one of colors including red, green, blue, cyan, magenta, white, and yellow, and may be formed through a process such as evaporation or coating. According to an embodiment of the present disclosure, the color filter is disposed on the second substrate 120, but the present disclosure is not limited thereto. According to an embodiment, the color filter may be disposed on the first substrate 110.

The liquid crystal layer is arranged in a specific direction by an electric field formed between the pixel electrode and the common electrode to adjust the transmittance of light emitted from the backlight unit 300 and thereby allow the display panel 100 to display the image.

Although not shown in the drawings, a signal input pad (not shown) may be disposed in the non-display area of the first substrate 110. The signal input pad may be electrically connected with a flexible circuit board 131 on which a driver IC 130 may be mounted. The flexible circuit board 131 may be electrically connected with a driver circuit board 140.

The flexible circuit board 131 may electrically connect the driver circuit board 140 with the display panel 100. The driver IC 130 may receive various control signals from the driver circuit board 140, and may output the driving signal for driving the display panel 100 to the display panel 100 in response to various inputted control signals. The flexible circuit board 131 is bent and then the driver circuit board 140 is disposed outside the housing 500.

Multiple electronic components (not shown) generating the driving signals and control signals of the display panel 10 may be mounted on the driver circuit board 140.

The touch sensor 200 may be disposed on at least one of both sides of the display panel 100. For example, the touch sensor 200 may be disposed on a side of the display panel 100 on which the image may be displayed to receive the touch input from a user. According to an embodiment, the touch sensor 200 may be integrated with the display panel 100. According to an embodiment of the present disclosure, a case where the touch sensor 200 is provided on an upper surface of the display panel 100 will be described by way of example.

The touch sensor 200 may detect a touch event from the display device via a user's hand or a separate input means. According to an embodiment of the present disclosure, the touch sensor 200 may be driven in the method of mutual capacitance. The mutual capacitance method is to detect a change in capacitance due to interaction between two adjacent touch electrodes. In addition, the touch sensor 200 may be driven in the method of self capacitance. The self capacitance method is to detect a change in capacitance of the touch electrode of a touched area when a user's touch occurs, using the touch electrodes arranged in the shape of the matrix and sensing lines coupled to the touch electrodes, respectively.

The backlight unit 300 is disposed on a side of the display panel 100 that is opposite to the side on which the image is displayed. The backlight unit 300 may include a light guide film 310, a color conversion layer 320, an optical member 330, a reflection sheet 340, and a light emitting array 350 including a plurality of light sources 351.

The light guide film 310 may be located under the display panel 100, and guide light emitted from the light emitting array 350 to emit light towards the display panel 100. Particularly, the light guide film 310 may overlap at least the display area of the display panel 100. In this regard, the light guide film 310 may include an exit surface to emit light, a lower surface that faces the exit surface, and side surfaces that couple the exit surface with the lower surface. At least one of the side surfaces may be an incident surface that may face the light emitting array 350 so that light emitted from the light emitting array 350 may be incident thereon, while a side surface facing the incident surface may be an opposite surface to reflect the light.

The light guide film 310 may be made of one of transmissive materials capable of transmitting light, for example, plastic materials such as polymethyl methacrylate (PMMA) that is acrylic transparent resin, polycarbonate (PC) materials, and glass. According to an embodiment of the present disclosure, the light guide film 310 may be made of glass which may be advantageous for realizing the slimming of the display device to which the backlight unit 300 may be applied. The light guide film 310 may include a specifically-shaped pattern (not shown) on a back surface to supply a uniform surface light source. The pattern may comprise various patterns, such as an elliptical pattern, a polygonal pattern, and a hologram pattern, so as to guide light incident on an interior of the light guide film 310.

The light emitting array 350 may include a plurality of light sources 351 and a printed circuit board 532.

The light sources 351 may include a light-emitting diode. According to an embodiment of the present disclosure, each of the light sources 351 may include a microscale light-emitting diode having a size of 300 µm or less. The light sources 351 may be mounted on the printed circuit board 352. In some examples, all the light sources 351 may emit the light of the same color. For example, the light sources 351 may emit blue light.

The light sources 351 may include a plurality of first light sources 351a arranged on a row of the printed circuit board 352, and a plurality of second light sources 351b arranged on a row that may be different and offset from that of the first light sources 351a. The arrangement relationship of the first and second light sources 351a and 351b will be described below with reference to FIG. 8A.

The light emitting array 350 may be disposed to face at least one of the side surfaces of the light guide film 310 and emit light, and may provide light used to display the image by the display panel 100 through the light guide film 310.

The optical member 330 may be provided between the light guide film 310 and the display panel 100. The optical member 330 may be provided on the light emitting array 350 to control light emitted through the light guide film 310. For example, the optical member 330 may include a diffusion sheet 330c, a prism sheet 330b, and a protective sheet 330a that may be sequentially stacked up.

The diffusion sheet 330c may serve to diffuse light emitted from the light guide film 310.

The prism sheet 330b may serve to concentrate light diffused from the diffusion sheet 330c in a direction perpendicular to a plane of the display panel 100 placed above the prism sheet. Most of the light passing through the prism sheet 330b may be perpendicularly incident on the display panel 100.

The protective sheet 330a may be placed on the prism sheet 330b. The protective sheet 330a may protect the prism sheet 330b from external shocks.

According to an embodiment of the present disclosure, the optical member 330 is provided with one diffusion sheet 330c, one prism sheet 330b, and one protective sheet 330a. But, the present disclosure is not limited thereto. For example, the optical member 330 may further include an optical sheet performing other functions, in addition to the diffusion sheet 330c, the prism sheet 330b, and the protective sheet 330a. Further, in the optical member 300, any one optical sheet of the diffusion sheet 330c, the prism sheet 330b, and the protective sheet 330a may be omitted. Furthermore, the optical member 330 may have a plurality of optical sheets of a specific kind, and the stacking sequence of respective optical sheets may be varied depending on a desired purpose. The present disclosure is not limited to a specific configuration.

The optical member 330 may further include a reflective polarizing sheet that may modulate light emitted from the light emitting array 350 into light in a specific direction. Moreover, the optical member 330 may further include an absorptive polarizing sheet to prevent light which is not linearly polarized in a desired specific direction from passing through the display panel 100.

The reflection sheet 340 may be disposed under the light guide film 310 to reflect light that is leaked (i.e., not provided towards the display panel 100 among light emitted from the light emitting array 350), thus changing the path of light towards the display panel 100. The reflection sheet 340 may be accommodated in the housing 500 to reflect light generated from the light emitting array 350 and thereby increase the amount of light provided towards the display panel 100.

The reflection sheet 340 may be made of a light reflecting material that is well known to those skilled in the art. As a non-limiting example of the reflection sheet 340, a reflection sheet may comprise one or more materials selected from polycarbonate-, polysulfone-, polyacrylate-, polystyrene-, polyvinyl chloride-, polyvinyl alcohol-, polynorbornene-, and polyester-based materials.

The backlight unit 300 may further include a color conversion layer 320 disposed between the light guide film 310 and the optical member 330.

The color conversion layer 320 may convert light emitted through the light guide film 310 into light having a specific color. For example, when the light sources 351 emit blue light, the color conversion layer 320 may convert the blue light into white light. To this end, the color conversion layer 320 may be formed such that at least one kind of light conversion particles may be dispersed in transparent resin. According to an embodiment of the present disclosure, the light conversion particles may be quantum dots. The color conversion layer 320 will be described below in detail with reference to FIGS. 6A and 6B.

The mold frame 400 may have a shape corresponding to the display panel 100 and the backlight unit 300, and may be open at an interior to receive the display panel 100 and the backlight unit 300.

The mold frame 400 may include a locking step formed along a sidewall. The display panel 100 may be seated on the locking step. Further, the light guide film 310 may be seated on a bottom of the locking step.

As illustrated in FIG. 2, the mold frame 400 may be provided with a coupling groove to be coupled with a part of the housing 500, for example, a protruding part of the housing 500. The mold frame 400 and the housing 500 may be coupled with each other by the coupling groove. In this regard, the protruding part of the housing 500 may protrude towards the display panel 100.

As described above, the mold frame 400 may be coupled with the housing 500 to fixedly support the display panel 100 and the backlight unit 300 in conjunction with the housing 500. The mold frame 400 may contain synthetic resin having insulating properties.

A first adhesive tape 710 and a second adhesive tape 720 may be provided on the upper surface of the mold frame 400. One of the first adhesive tape 710 and the second adhesive tape 720 may secure the display panel 100 to the mold frame 400. For example, the first adhesive tape 710 may be provided between the display panel 100 and the mold frame 400 to secure the display panel 100 to the mold frame 400.

Another one of the first adhesive tape 710 and the second adhesive tape 720, for example, the second adhesive tape 720, may secure the touch sensor 200 to the mold frame 400. That is, the second adhesive tape 720 may be provided between the touch sensor 200 and the mold frame 400 to secure the touch sensor 200 to the mold frame 400.

The first adhesive tape 710 or the second adhesive tape 720 may have elasticity to absorb pressure or shock generated when a user touches the touch sensor 200.

The second adhesive tape 720 may be disposed on the mold frame 400 corresponding to sides other than a side connected to the driver circuit board 140 of the display panel 100. That is, the second adhesive tape 720 may not be provided on the mold frame 400 corresponding to the side connected to the driver circuit board 140 of the display panel 100.

The housing 500 may be provided under the backlight unit 300. The housing 500 may include a space to accommodate the display panel 100 and the backlight unit 300 therein. The housing 500 receives and supports the display panel 100 and the backlight unit 300 therein.

Figure 3:
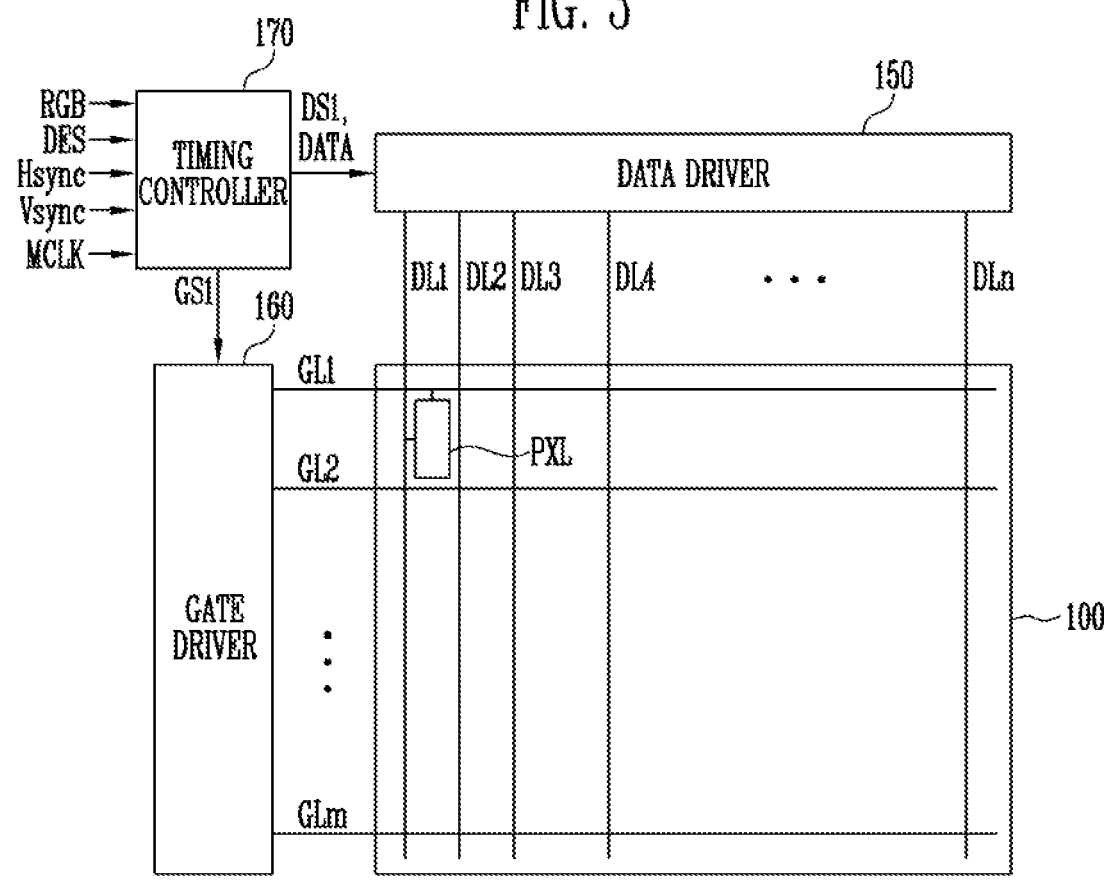
FIG. 3 is a block diagram illustrating an embodiment of pixels and a drive unit in the display device of FIG. 1 according to an embodiment of the present disclosure.

FIG. 3 is a block diagram illustrating an embodiment of pixels and a drive unit in the display device of FIG. 1.

Referring to FIGS. 1 and 3, the display device according to an embodiment of the present disclosure includes a display panel 100, a timing controller 170, a gate driver 160, and a data driver 150.

The display panel 100 may be a liquid crystal panel including a first substrate 110, a second substrate 120, and a liquid crystal layer (not shown) disposed between the first substrate 110 and the second substrate 120.

The display panel 100 includes a plurality of gate lines GL1 to GLm extending in a row direction, and a plurality of data lines DL1 to DLn extending in a column direction crossing the row direction. The display panel 100 may include a plurality of pixels PXL. The pixels PXL may be arranged in the row direction and the column direction. Each of the pixels PXL may include at least one transistor connected to a corresponding gate line among the gate lines GL1 to GLm and a corresponding data line among the data lines DL1 to DLn.

The timing controller 170 receives image data RGB and a control signal from an external video source (not shown). The control signal may include a vertical synchronization signal Vsync that is a frame distinguishing signal, a horizontal synchronization signal Hsync that is a row distinguishing signal, a data enable signal DES that is at a high level only in a section where data is outputted to indicate a region to which the data is supplied, and a main clock signal MCLK.

The timing controller 170 converts the image data RGB to match the specification of the data driver 150, and outputs the converted image data DATA to the data driver 150. The timing controller 170 generates the gate control signal GS1 and the data control signal DS1 based on the control signal. The timing controller 170 outputs the gate control signal GS1 to the gate driver 160, and outputs the data control signal DS1 to the data driver 150. The gate control signal GS1 is a signal for driving the gate driver 160, and the data control signal DS1 is a signal for driving the data driver 150.

The gate driver 160 generates the gate signal based on the gate control signal GS1, and outputs the gate signal to the gate lines GL1 to GLm. The gate control signal GS1 may include a scan start signal indicating the start of scanning, at least one clock signal controlling an output period of gate-on voltage, and an output enable signal defining the duration of the gate-on voltage.

The data driver 150 generates gray-scale voltage according to the converted image data DATA based on the data control signal DS1, and then outputs the gray-scale voltage to the data lines DL1 to DLn as the data voltage. The data voltage may include positive data voltage having a positive value and negative data voltage having a negative value with respect to the common voltage. The data control signal DS1 may include a horizontal start signal indicating the start of the transmission of the converted image data DATA to the data driver 150, a load signal applying the data voltage to the data lines DL1 to DLn, and a reverse signal reversing the polarity of the data voltage with respect to the common voltage.

Each of the timing controller 170, the gate driver 160, and the data driver 150 may be directly mounted on the display panel 100 in the form of at least one integrated circuit chip, or mounted on the flexible circuit board 131 as illustrated in FIG. 1 and then attached to the display panel 100 in the form of a tape carrier package (TCP), or mounted on a separate printed circuit board.

According to an embodiment, at least one of the gate driver 160 and the data driver 150 may be integrated into the display panel 100 with the gate lines GL1 to GLm, the data lines DL1 to DLn, and the transistor. Further, the timing controller 170, the gate driver 160, and the data driver 150 may be integrated into a single chip.

The display device illustrated in FIG. 3 may be implemented in various forms.

Figure 4:
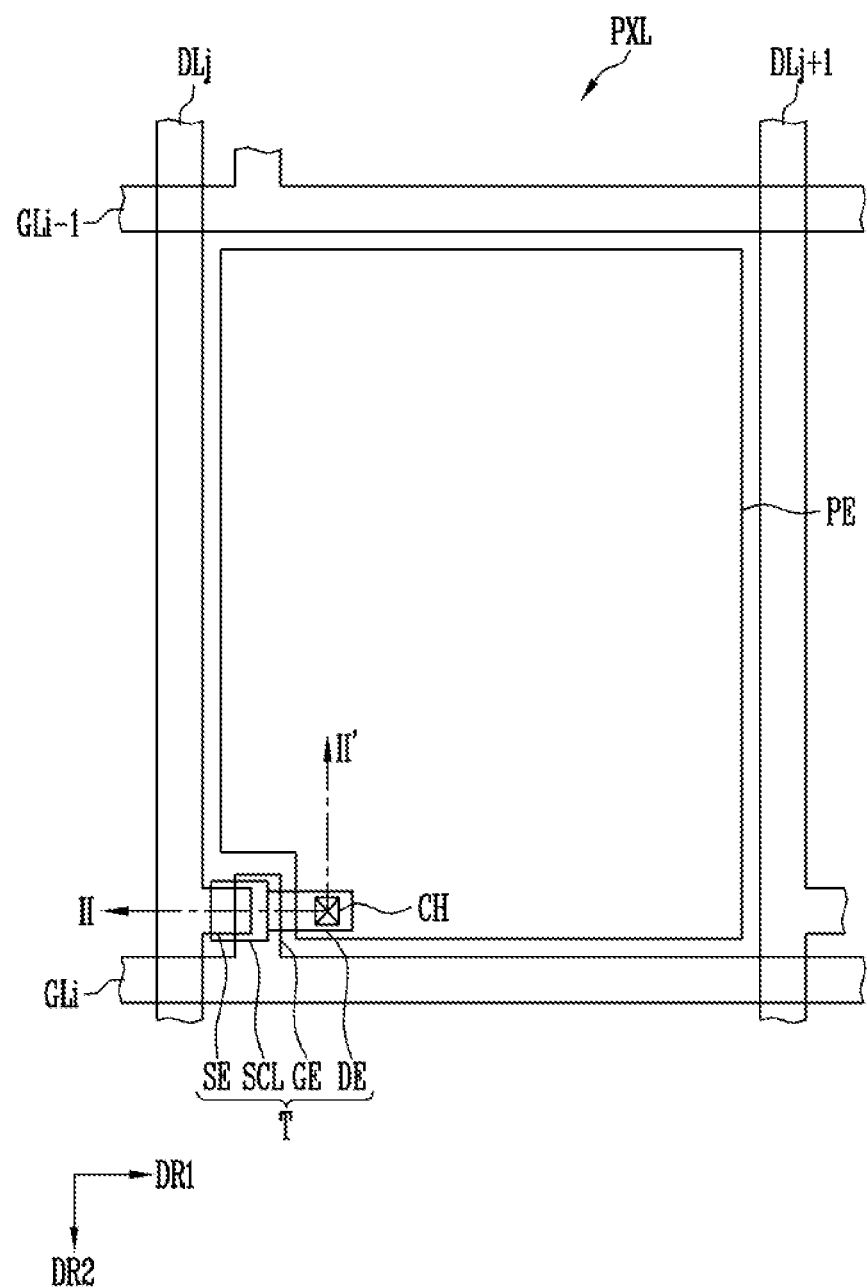
FIG. 4 is a plan view illustrating one of the pixels shown in FIG. 3 according to an embodiment of the present disclosure.
Figure 5:
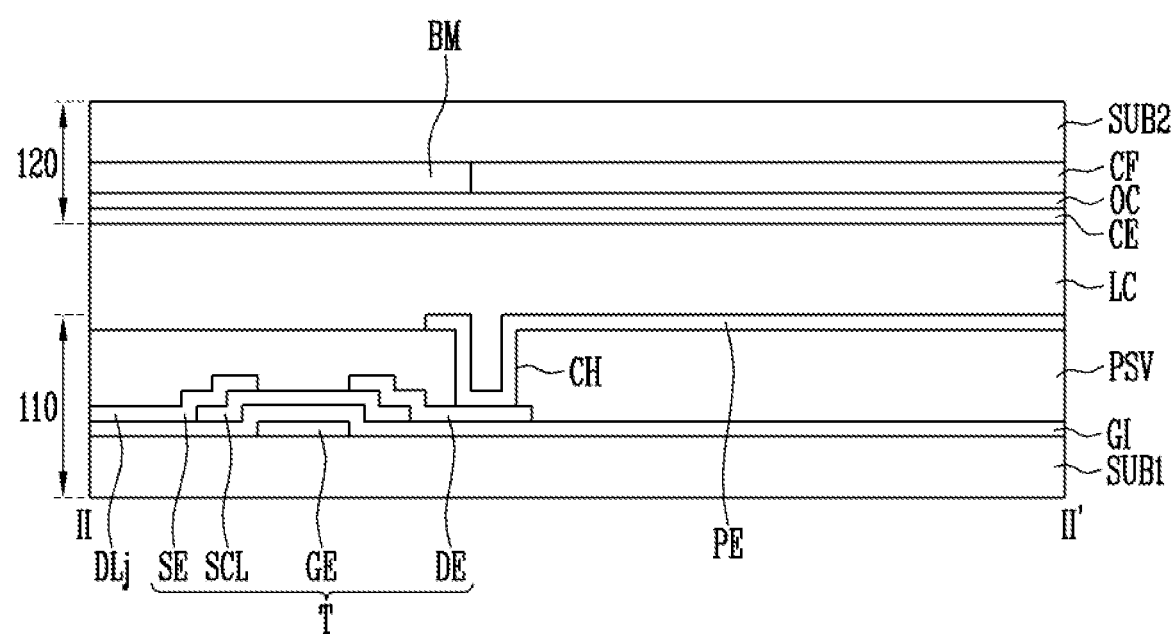
FIG. 5 is a sectional view taken along line II-II' of FIG. 4 according to an embodiment of the present disclosure.

FIG. 4 is a plan view illustrating one of the pixels shown in FIG. 3 according to an embodiment of the present disclosure, and FIG. 5 is a sectional view taken along line II-II' of FIG. 4 according to an embodiment of the present disclosure.

Referring to FIGS. 1 to 5, the display device according to an embodiment of the present disclosure includes a first substrate 110, a second substrate 120 that faces the first substrate 110, and a liquid crystal layer LC that is formed between the first substrate 110 and the second substrate 120.

The first substrate 110 includes a first base substrate SUB1, a plurality of gate lines GL1 to GLm, a plurality of data lines DL1 to DLn, and a plurality of pixels PXL.

The first base substrate SUB1 may include a transparent insulating material to allow the transmission of light. The first base substrate SUB1 may be a rigid substrate or a flexible substrate.

Examples of the rigid substrate may include a glass substrate, a quartz substrate, a glass ceramic substrate, and a crystalline glass substrate. Examples of the flexible substrate may include a film substrate and a plastic substrate, each of which includes polymer organic material. Specifically, the flexible substrate may include polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate and others. However, the first base substrate SUB1 may be made of various materials, including fiber reinforced plastic (FRP).

The first substrate 110 is provided with a plurality of pixel areas arranged in the form of a matrix, each of the pixels PXL corresponding to each pixel area. The pixels PXL are each connected to a corresponding data line among the data lines DL1 to DLn that are sequentially arranged, and to a corresponding gate line among the gate lines GL1 to GLm. For the convenience of description, according to an embodiment of the present disclosure, the gate line GLi and the data line DLj connected to one pixel PXL based on one pixel PXL arranged on an i-th row and a j-th column in the first substrate 110 are shown.

The gate line GLi is formed on the first base substrate SUB1 to extend in a first direction DR1. The data line DLj extends in a second direction DR2 crossing the first direction DR1, with a gate insulation layer GI being interposed between the data line and the gate line GLj. The gate insulation layer GI is provided on a front of the first base substrate SUB1 to cover the gate line GLi. FIG. 4 illustrates an (i−1)-th gate line GLi−1 arranged in parallel with the gate line GLi and a (j+1)-th data line DLj+1 arranged in parallel with the data line DLj.

One pixel PXL may include a thin film transistor T connected to the gate line GLi and the data line DLj, and a pixel electrode PE connected to the thin film transistor T.

The thin film transistor T includes a gate electrode GE, a semiconductor layer SCL, a source electrode SE, and a drain electrode DE.

The gate electrode GE protrudes from the gate line GLi or is provided on some area of the gate line GLi.

The gate electrode GE may be made of metal. For example, the gate electrode GE may be made of nickel, chromium, molybdenum, aluminum, titanium, copper, tungsten, and alloys thereof. The gate electrode GE may be made of the metal in the form of a single film or a multiple film. For instance, the gate electrode GE may be a triple film made by sequentially stacking molybdenum, aluminum, and molybdenum, or may be a double film made by sequentially stacking titanium and copper. Alternatively, the gate electrode may be the single film made of an alloy of titanium and copper.

The gate insulation layer GI is provided on the gate electrode GE.

The semiconductor layer SCL is provided on the gate insulation layer GI. The semiconductor layer SCL is provided on the gate electrode GE, with a gate insulation layer GI being interposed between the semiconductor layer and the gate electrode. A portion of the semiconductor layer SCL may overlap the gate electrode GE. The semiconductor layer SCL may contain one of amorphous silicon (a-Si), polycrystalline silicon (p-Si) and an oxide semiconductor. Here, the oxide semiconductor may contain at least one of Zn, In, Ga, Sn and mixtures thereof. For example, the oxide semiconductor may contain Indium-Gallium-Zinc Oxide (IGZO).

Areas on the semiconductor layer SCL that are coupled to the source electrode SE and the drain electrode DE may be referred to as a source area and a drain area with or into which impurities have been doped or injected. An area between the source area and the drain area may be a channel area. According to an embodiment of the present disclosure, the semiconductor layer SCL may have a structure formed by sequentially stacking an active layer made of an amorphous silicon material and an ohmic contact layer made of an impurity amorphous silicon material.

The source electrode SE may be branched from the data line DLj. The source electrode SE is coupled to one end of the semiconductor layer SCL and some area of the source electrode overlaps the gate electrode GE.

The drain electrode DE is spaced apart from the source electrode SE, with some area of the semiconductor layer SCL being interposed therebetween. The drain electrode DE is coupled to the other end of the semiconductor layer SCL and some area thereof overlaps the gate electrode GE.

The source electrode SE and the drain electrode DE may be made of nickel, chromium, molybdenum, aluminum, titanium, copper, tungsten, and alloys thereof. The source electrode SE and the drain electrode DE may be made of a metal in the form of a single film or a multiple film. For instance, the source electrode SE and the drain electrode DE may be a double film made by sequentially stacking titanium and copper. Alternatively, the source electrode and the drain electrode may be a single film made of an alloy of titanium and copper.

The source electrode SE and the drain electrode DE are spaced apart from each other, so that the upper surface of the semiconductor layer SCL between the source electrode SE and the drain electrode DE is exposed. The semiconductor layer SCL between the source electrode SE and the drain electrode DE forms a conductive channel between the source electrode SE and the drain electrode DE depending on whether the voltage of the gate electrode GE is applied or not.

In the present embodiment, there has been illustrated a case where the thin film transistor T is a thin film transistor having a bottom gate structure, but the present disclosure is not limited thereto. For example, the thin film transistor T may be a thin film transistor having a top gate structure.

The pixel electrode PE is connected to the drain electrode DE of the thin film transistor T, with a protective layer PSV being interposed therebetween. To this end, the protective layer PSV may include a contact hole CH through which a part of the drain electrode DE may be exposed.

The protective layer PSV may include at least one of an inorganic insulator made of an inorganic material and/or an organic insulator made of an organic material. Further, the protective layer PSV may be provided to include an inorganic insulator covering the thin film transistor 1, and an organic insulator disposed on the inorganic insulator. The inorganic insulator may include at least one of silicon oxide (SiOx) and silicon nitride (SiNx). The organic insulator may include an organic insulating material to allow the transmission of light. The organic insulator may include at least one of acrylic resin (polyacrylate resin), epoxy resin, phenolic resin, polyamides resin, polyimides rein, unsaturated polyesters resin, polyphenylene ethers resin, polyphenylene sulfides resin, and benzocyclobutene resin.

The pixel electrode PE may include transparent conductive oxide. For example, the pixel electrode PE may include at least one of indium tin oxide (ITO), indium zinc oxide (IZO), aluminum zinc oxide (AZO), gallium doped zinc oxide (GZO), zinc tin oxide (ZTO), gallium tin oxide (GTO), and fluorine doped tin oxide (FTO).

The second substrate 120 may be an opposite substrate facing the first substrate 110. The second substrate 120 may include a second base substrate SUB2, a color filter CF, a light blocking pattern BM, an overcoat layer OC, and a common electrode CE.

The second base substrate SUB2 may contain the same material as the first base substrate SUB1. That is, the second base substrate SUB2 may be a rigid substrate or a flexible substrate.

The light blocking pattern BM may be disposed on a surface of the second base substrate SUB2, for example, a surface facing the first substrate 110. The light blocking pattern BM may be disposed to correspond to a boundary of the pixel areas. Further, the light blocking pattern BM may prevent light leakage due to the misalignment of liquid crystal molecules in the liquid crystal layer LC.

The color filter CF may be provided on the second base substrate SUB2 exposed by the light blocking pattern BM. The color filter CF may have a color such as red, green, blue, cyan, magenta, white, and yellow. The color filter may be disposed to correspond to the pixel area. Although it is illustrated in an embodiment of the present disclosure that the color filter CF is included in the second substrate 120, the present disclosure is not limited thereto. For example, the color filter CF may be included in the first substrate 110.

The overcoat layer OC may cover the color filter CF, and may reduce a step (i.e., an uneven surface) caused by the light blocking pattern BM and the color filter CF.

The common electrode CE may be provided on the overcoat layer OC. The common electrode CE may be insulated from the pixel electrode PE, and may contain the same material as the pixel electrode PE. Further, the common electrode CE may receive a common voltage supplied from an outside source. The common electrode CE may be disposed on a surface of the second substrate 120 facing the first substrate 110.

In this embodiment, the common electrode CE is included in the second substrate 120, but the present disclosure is not limited thereto. For example, the common electrode CE may be included in the first substrate 110 while being insulated from the pixel electrode PE. In this case, at least one of the pixel electrode PE and the common electrode CE may be provided with a plurality of slits.

The liquid crystal layer LC may include a plurality of liquid crystal molecules. The liquid crystal molecules may be arranged in a specific direction by an electric field that is formed by the pixel electrode PE and the common electrode CE, thus adjusting the transmittance of light. Therefore, the liquid crystal layer LC transmits light supplied from the backlight unit 300 to allow the display panel 100 to display an image.

Figure 6A:
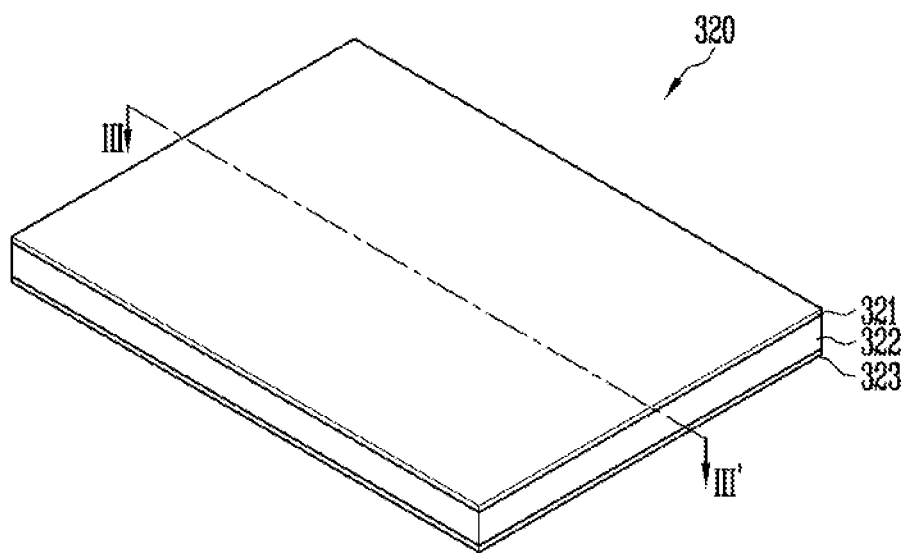
FIG. 6A is a perspective view illustrating a color conversion layer of FIG. 1 according to an embodiment of the present disclosure.
Figure 6B:
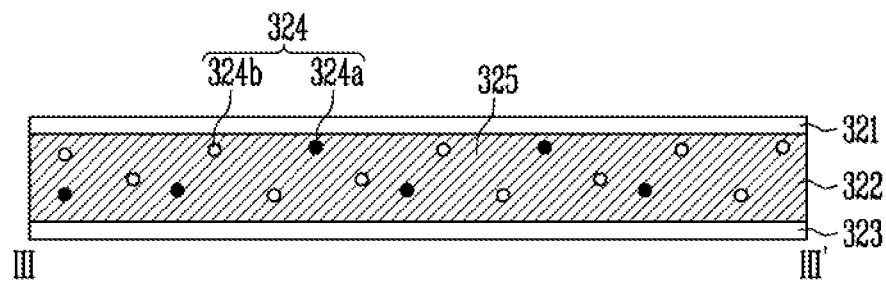
FIG. 6B is a sectional view taken along line III-III' of FIG. 6A according to an embodiment of the present disclosure.

FIG. 6A is a perspective view illustrating the color conversion layer of FIG. 1 according to an embodiment of the present disclosure, and FIG. 6B is a sectional view taken along line III-III' of FIG. 6A according to an embodiment of the present disclosure.

Referring to FIGS. 1 to 5, 6a and 6b, the color conversion layer 320 is provided on the upper surface of the light guide film 310, and converts the wavelength band of light emitted from the light sources 351 to convert the color of the light color. According to an embodiment of the present disclosure, each light source 351 may emit the blue light within a wavelength range from approximately 405 nm to 450 nm.

The color conversion layer 320 may include a light conversion layer 322, and first and second buffer layers 321 and 323 protecting the upper surface and the lower surface of the light conversion layer 322, respectively.

The first and second buffer layers 321 and 323 may serve to maintain the shape of the light conversion layer 322 and to prevent the light conversion layer 322 from being damaged by an external force. The first and second buffer layers 321 and 323 may contain polymers such as polyethylene terephthalate (PET), silicon oxide, titanium oxide, or aluminum oxide, and suitable combinations thereof, and may have the thickness of approximately 50 μm, but the present disclosure is not limited thereto.

The first and second buffer layers 321 and 323 may have low oxygen permeability and low moisture permeability. Thus, the first and second buffer layers 321 and 323 may protect the light conversion layer 322 from external chemical impact such as might be caused by contact with moisture and/or oxygen.

The light conversion layer 322 may be configured such that at least one kind of the plurality of light conversion particles 324 may be dispersed throughout the base layer 325. According to an embodiment of the present disclosure, the base layer 325 may be transparent resin.

The light conversion particles 324 may be predetermined sized particles having a quantum confinement effect, which may also referred to as quantum dots. However, a quantum dot may be one of a number of suitable nanomaterials, which may arise as a result of a study on nano devices (i.e., small particles having a size on the order of a nanometer, and which may serve a particular function in a device).

A quantum dot may have various properties that are not found in other materials. First, a quantum dot generates strong fluorescence in a narrow wavelength range. Light emitted by a quantum dot is generated by unstable (excited) electrons falling from a conduction band to a valence band. The fluorescence generates light of a shorter wavelength as the particle of the quantum dot becomes smaller, and generates light of a longer wavelength as the particle of the quantum dot becomes larger. Thus, it is possible to emit light of a desired wavelength by adjusting the particle size of the quantum dot.

In some examples, the light conversion particles 324 are semiconductor crystals of several nanometers (nm) in size, which are produced through a chemical synthetic process. They convert the wavelength of light emitted from each light source 351 and then emit the converted light. Depending on the size of the particle, a light emitting wavelength may be varied to emit all colors of visible light. A diameter of the light conversion particle 324 ranges from 1 nm to 10 nm.

The light conversion particles 324 may include a first light conversion particle 324a and a second light conversion particle 324b.

The first light conversion particle 324a may be a red quantum dot, and the second light conversion particle 324b may be a green quantum dot. When blue light enters the color conversion layer 320 the first light conversion particle 324a absorbs the blue light and shifts the wavelength of the light according to an energy transition to emit red light of a wavelength from about 620 nm to 680 nm. Similarly, when blue light enters the color conversion layer 320 the second light conversion particle 324b absorbs the blue light and shifts the wavelength according to another energy transition to emit green light of a wavelength from about 500 nm to 560 nm.

The first light conversion particle 324a and the second light conversion particle 324b may be selected from group II-IV compounds, group III-V compounds, group IV-VI compounds, group IV elements, group VI compounds and any combination thereof.

The group II-VI compounds may be selected from the group consisting of: a binary compound selected from the group consisting of CdSe, CdTe, ZnS, ZnSe, ZnTe, ZnO, HgS, HgSe, HgTe, MgSe, MgS, and a mixture thereof; a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quanternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

The group III-V compound may be selected from the group consisting of: a binary compound selected from the group consisting of GaN, GaP, GaAs, GaSb, AlN, AlP, AlAs, AlSb, InN, InP, InAs, InSb, and a mixture thereof; a ternary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a quanternary compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof.

The group IV-VI compound may be selected from the group consisting of: a binary compound selected from the group consisting of SnS, SnSe, SnTe, PbS, PbSe, PbTe, and a mixture thereof; a ternary compound selected from the group consisting of SnSeS, SnSeTe, SnSTe, PbSeS, PbSeTe, PbSTe, SnPbS, SnPbSe, SnPbTe, and a mixture thereof; and a quanternary compound selected from the group consisting of SnPbSSe, SnPbSeTe, SnPbSTe, and a mixture thereof.

The group IV element may be selected from the group consisting of Si, Ge, and a mixture thereof. The group VI compound may be a binary compound selected from the group consisting of SiC, SiGe, and a mixture thereof.

Binary compounds, ternary compounds or quanternary compounds may be present in the particle in a uniform concentration, or may be present in the same particle after a concentration distribution is partially divided into different states. Further, the first light conversion particle 324a and the second light conversion particle 324b may have a core/shell structure such that one quantum dot (the shell) may surround another quantum dot (the core). An interface between the core and the shell may have a concentration gradient in which the concentration of the element present in the shell decreases towards a center.

The first light conversion particle 324a and the second light conversion particle 324b are not limited to any particular shape. Rather, the particles may various shapes including a spherical shape, a pyramidal shape, a multi-arm shape, or a cubic nanoparticle, a nanotube, a nano line, a nano fiber, a nano plate particle or the like.

According to an embodiment of the present disclosure, since the first and second light conversion particles 324a and 324b have high color purity, white light having excellent optical characteristics may be produced. Specifically, while blue light emitted from each light source 351 passes through the color conversion layer 320, the light is converted into red light by the first light conversion particle 324a, and is converted into green light by the second light conversion particle 324b. The blue light emitted from each light source 351, the red light converted by the first light conversion particle 324a, and the green light converted by the second light conversion particle 324b are mixed with each other, so that it is possible to realize white light having excellent optical characteristics. The white light that is ultimately emitted from the color conversion layer 320 may be supplied towards the display panel 100.

According to an embodiment of the present disclosure, the color conversion layer 320 may further include a coating layer (not shown) provided on an outer surface of the first protective layer 321. The coating layer serves to scatter light passing through the light conversion sheet 322 and thereby allow the light to have a uniform distribution on the display panel 100.

Figure 8A:
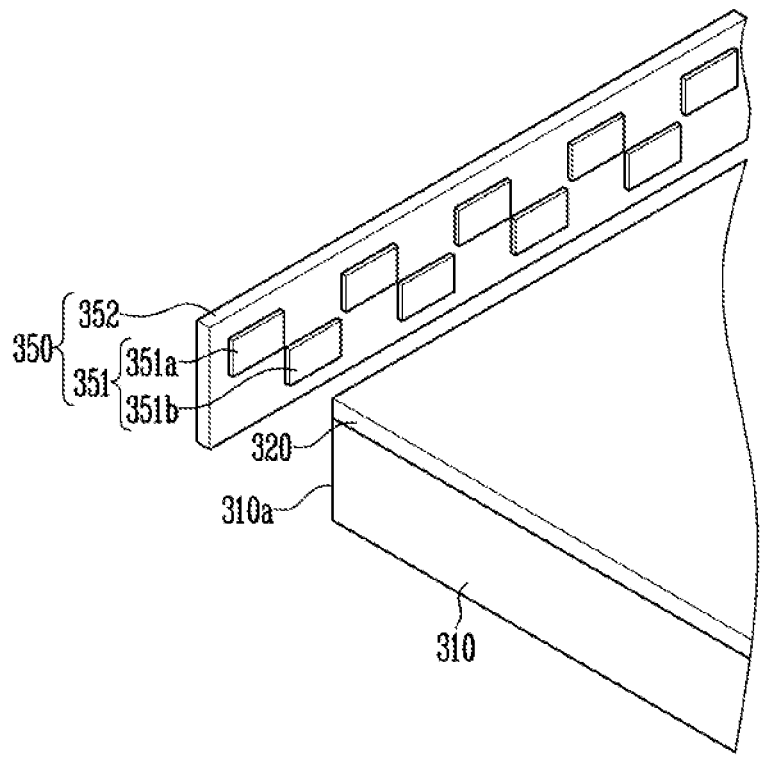
FIG. 8A is a partially enlarged perspective view illustrating a part of the backlight unit of FIG. 7 according to an embodiment of the present disclosure.
Figure 8B:
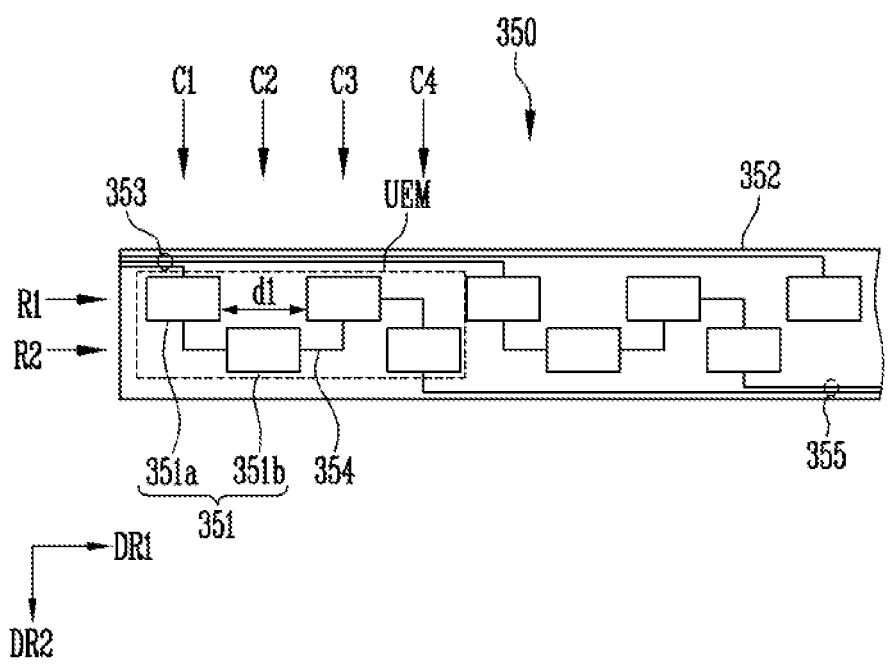
FIG. 8B is a plan view schematically illustrating a light emitting array of FIG. 8A according to an embodiment of the present disclosure.

FIG. 7 is an exploded perspective view illustrating the backlight unit of FIG. 1 according to an embodiment of the present disclosure. FIG. 8A is a partially enlarged perspective view illustrating a part of the backlight unit of FIG. 7 according to an embodiment of the present disclosure, and FIG. 8B is a plan view schematically illustrating the light emitting array of FIG. 8A according to an embodiment of the present disclosure. FIG. 9 is a plan view schematically illustrating a state in which the light emitting array of FIG. 7 is applied to all four sides of the light guide film according to an embodiment of the present disclosure.

Referring to FIGS. 1, 7, 8A, 8B, and 9, the backlight unit 300 includes the light emitting array 350, the light guide film 310, the color conversion layer 320, the reflection sheet 340, and the optical member 330.

The light emitting array 350 may include a plurality of light sources 351, and a printed circuit board 352 on which the light sources 351 may be mounted.

Each light source 351 may include at least one light-emitting diode and a light emitting package accommodating the light-emitting diode. According to an embodiment of the present disclosure, each light source 351 may include a gallium nitride (GaN) based light-emitting diode having a size of about 300 µm and configured to emit blue light.

The blue light L1 emitted from each light source 351 is incident through the incident surface 310a of the light guide film 310 into the light guide film 310. The blue light L1 incident into the light guide film 310 is reflected in the light guide film 310, guided through the upper surface of the light guide film 310 to the display panel 100 in the form of a surface light source, and then emitted as blue light L2.

When the blue light L2 emitted from the upper surface of the light guide film 310 passes through the color conversion layer 320, the light may be processed into white light L3 having excellent optical characteristics and may be supplied through the optical member 300 to the display panel 100.

Although FIG. 7 illustrates that the light emitting array 350 is disposed only on one side of the light guide film 310, for example, the incident surface 310a, the present disclosure is not limited thereto. According to an embodiment, the light emitting array 350 may be disposed on two sides, three sides or all sides of the light guide film 310 as illustrated in FIG. 9. Other suitable configurations are also possible.

According to an embodiment of the present disclosure, the light sources 351 may include a plurality of first light sources 351a and a plurality of second light sources 351b. The first light sources 351a and the second light sources 351b may have the same size. That is, the first light sources 351a and the second light sources 351b may have a size of around 300 µm or less.

The first light sources 351a extend in a first direction DR1 (e.g., row direction) to form a first light emitting row R1. Each of the first light sources 351a in the first light emitting row R1 may be arranged on the printed circuit board 352 to be spaced apart from an adjacent first light source 351a by a first distance d1.

According to an embodiment of the present disclosure, the first distance d1 may be the same as or similar to a horizontal width of each of the first light sources 351a. The horizontal width means the width of each of the first light sources 351a in the first direction DR1. According to an embodiment of the present disclosure, the first distance d1 may be approximately 300 µm or less. According to an embodiment, each of the first light sources 351a may be arranged on the printed circuit board 352 to be spaced apart from the adjacent first light source 351a by the first distance d1 or more.

The second light sources 351b extend in the first direction DR1 to form a second light emitting row R2. Each of the second light sources 351b in the second light emitting row R2 may be arranged on the printed circuit board 352 to be spaced apart from an adjacent second light source 351b by the first distance d1.

Thus, the light emitting array including a plurality of light sources 351 and a light guide film configured to receive light from the light emitting array through an edge of the light guide film 310 having a thickness smaller than a surface of the light guide film 310 through which the light is transmitted out of the light guide film 310. The light sources may be arranged in a plurality of rows (e.g., row R1 and R2) on the light emitting array, and each of the light sources 351 has a size (i.e., a height in the vertical direction DR2) less than the thickness of the light guide film 310 divided by the number of rows.

The light emitting array 350 may include a unit light emitting area UEM formed by combining at least one first light source 351a and at least one second light source 351b arranged in different light emitting rows. A plurality of unit light emitting areas UEM may be provided on the light emitting array 350.

According to an embodiment of the present disclosure, one first light source 351a (hereinafter, referred to as the '1-1 light source') arranged on the first column C1 of the first light emitting row R1, one second light source 351b (hereinafter, referred to as the '2-1 light source') arranged on the second column C2 of the second light emitting row R2, one first light source 351a (hereinafter, referred to as the '1-2 light source') arranged on the third column C3 of the first light emitting row R1, and one second light source 351b (hereinafter, referred to as the '2-2 light source') arranged on the fourth light emitting column C4 of the second light emitting row R2 may constitute one unit light emitting area UEM.

Each unit light emitting area UEM may be characterized by having a plurality of light sources 351 connected in series to a common electrical power source, and each unit light emitting area UEM may have a distinct power source or a distinct set of electrical power connections. In some examples, one or more unit light emitting areas UEM may be connected in parallel to a same power source.

Although FIG. 8B illustrates that the unit light emitting area UEM includes only the 1-1 light source 351a, the 1-2 light source 351a, the 2-1 light source 351b, and the 2-2 light source 351b, the present disclosure is not limited thereto. According to an embodiment, the number and arrangement of the light sources 351 provided on the unit light emitting area UEM may be variously changed.

A line unit connected to the light sources 351 may be provided on the printed circuit board 352. The line unit may include first to third lines 353, 354 and 355.

According to an embodiment of the present disclosure, the first line 353 may be a first power supply line that may electrically connect an external power supply unit (not shown) with the light sources 351 to supply a light-source drive voltage of the power supply unit to the light sources 351. The second line 354 may be an interconnection line electrically connecting the light sources 351 included in the unit light emitting area UEM. The third line 355 may be a second power supply line to which a ground voltage may be supplied.

According to an embodiment of the present disclosure, the 1-1 light source 351a included in the unit light emitting area UEM may be electrically connected to the first line 353, and the 2-2 light source 351b may be electrically connected to the third line 355.

The 1-1 light source 351a may be electrically connected through the second line 354 to the 2-1 light source 351b, the 2-1 light source 351b may be connected through the second line 354 to the 1-2 light source 351a, and the 1-2 light source 351a may be connected through the second line 354 to the 2-2 light source 351b.

Hence, the light-source drive voltage transmitted to the 1-1 light source 351a may then be transmitted in order to the 2-1 light source 351b, the 1-2 light source 351a, and the 2-2 light source 351b. Thus, the light sources 351 included in the unit light emitting area UEM may be driven, respectively, to emit the blue light.

The connecting relationship of the light sources 351 included in the unit light emitting area UEM is not limited to the above-described embodiment. According to an embodiment, the 1-1 light source 351a may be connected through the second line 354 to the 1-2 light source 351a, the 1-2 light source 351a may be connected through the second line 354 to the 2-1 light source 351b, and the 2-1 light source 351b may be connected through the second line 354 to the 2-2 light source 351b.

According to an embodiment of the present disclosure, the first light sources 351a included in the unit light emitting area UEM may be arranged on odd-numbered columns C1 and C3 in the unit light emitting area UEM, and the second light sources 351b included in the unit light emitting area UEM may be arranged on even-numbered columns C2 and C4 in the unit light emitting area UEM. Hence, the first light sources 351a and the second light sources 351b included in the unit light emitting area UEM may be alternately arranged on the printed circuit board 352 in a second direction DR2 crossing the first direction DR1.

In the backlight unit 300 according to an embodiment of the present disclosure having the above-mentioned configuration, the micro-scale light sources 351 each having a size of 300 μm or less are mounted on the printed circuit board 352. Thus, the backlight unit 300 may have a large number of light sources 351 (i.e., a larger number or higher density of light sources 351 than may be practical using a configuration other than that described in the present disclosure), so that it is possible to increase the intensity of light emitted from the light emitting array 350. Hence, the light output efficiency of the light sources 351 may be enhanced, and the quality of the image displayed on the display panel 100 may also be enhanced. In addition, according to an embodiment of the present disclosure, the backlight unit 300 has a large number of micro-scale light sources 351, thus enhancing local dimming performance.

In addition, according to an embodiment of the present disclosure, the backlight unit 300 is configured such that the micro-scale light sources 351, each having a size of about 300 μm or less, are mounted on the printed circuit board 352, thus minimizing a distance between neighboring light sources 351 and minimizing a hot spot defect.

Specifically, if each of the first light sources 351a emits blue light, a hot spot defect may occur in which an area between the first light sources 351a is darker than areas corresponding to the first light sources 351a. Thereby, according to an embodiment of the present disclosure, the second light sources 351b may be arranged on the second light emitting row R2 in the areas between the first light sources 351a, thus increasing the amount of light emitted from the areas between the first light sources 351a and reducing the hot spot defect.

Likewise, if each of the second light sources 351b emits blue light, a hot spot defect may occur in which an area between the second light sources 351b is darker than areas corresponding to the second light sources 351b. Thereby, according to an embodiment of the present disclosure, the first light sources 351a may be arranged on the first light emitting row R1 in the areas between the second light sources 351b, thus increasing the amount of light emitted from the areas between the second light sources b and reducing the hot spot defect.

Moreover, according to an embodiment of the present disclosure, the backlight unit 300 includes micro-scale light sources 351 each having a size of 300 μm or less, so that all light emitted from each light source 351 is incident on the light guide film 310 without deviating from the light guide film 310, thus preventing a light leakage defect. In another example, the backlight unit 300 may include micro-scale light sources 351 each having a size of less than half the thickness of the light guide film 310. That is, the light sources 351 may be small enough so that two or more rows of light sources 351 may be arranged without exceeding the thickness of the light guide film 310. Hence, the backlight unit 300 may be advantageously applied to a slim display device.

Figure 10A:
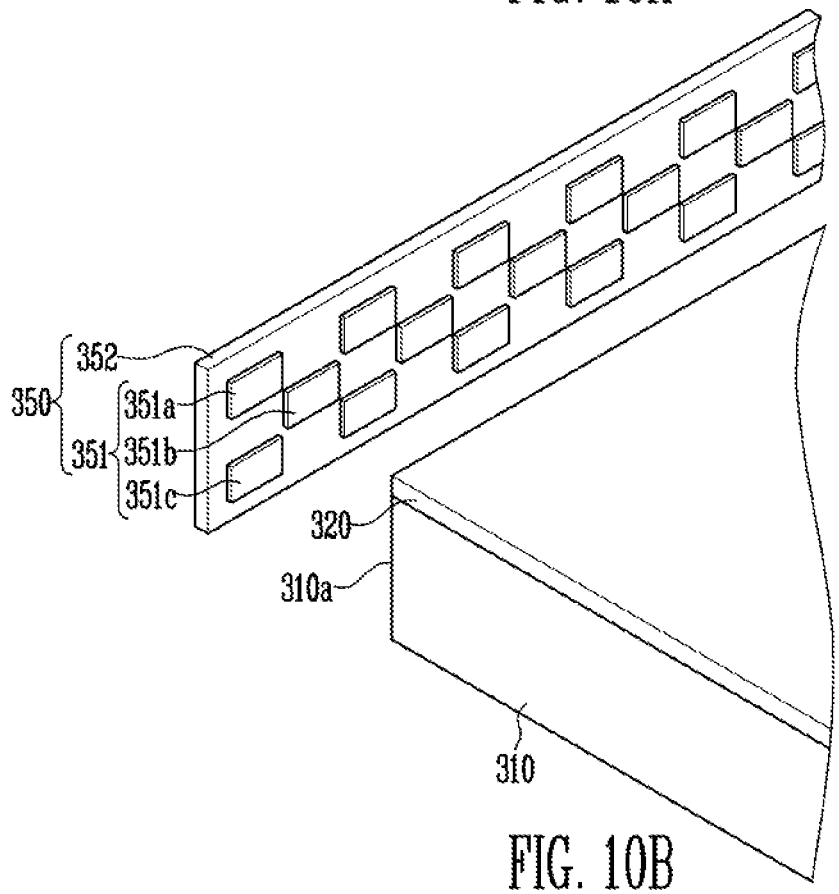
FIG. 10A is a partially enlarged perspective view illustrating a part of a backlight unit including a light emitting array according to another embodiment.
Figure 10B:
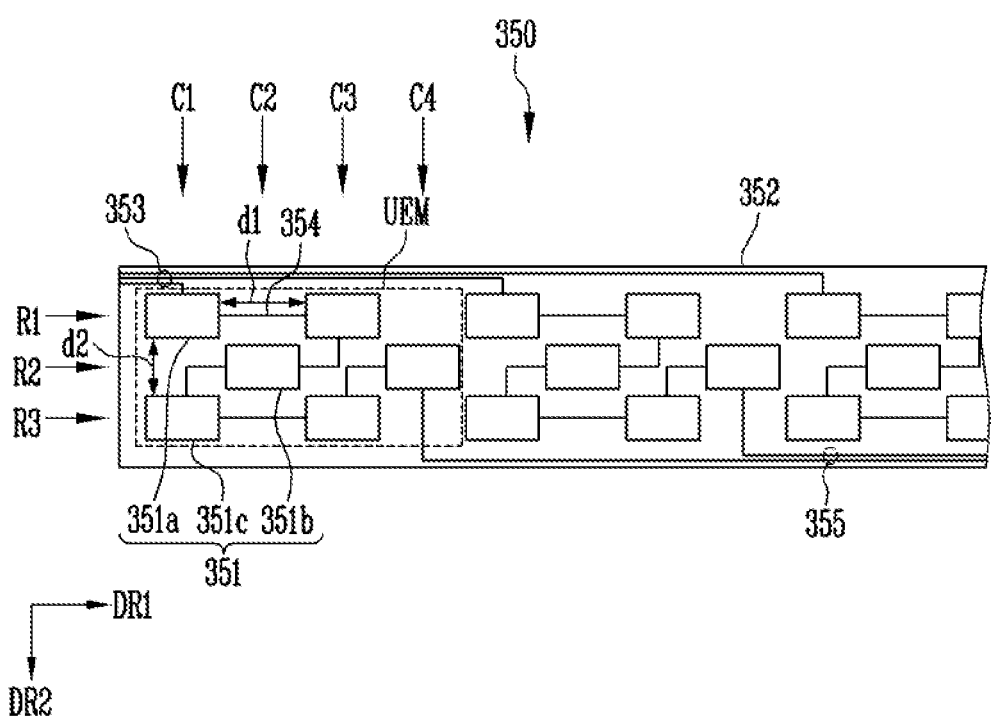
FIG. 10B is a plan view schematically illustrating the light emitting array of FIG. 10A according to an embodiment of the present disclosure.

FIG. 10A is a partially enlarged perspective view illustrating a part of a backlight unit including a light emitting array according to another embodiment, and FIG. 10B is a plan view schematically illustrating the light emitting array of FIG. 10A according to an embodiment of the present disclosure.

The backlight unit illustrated in FIGS. 10A and 10B may have a configuration substantially the same as or similar to the backlight unit of FIGS. 8A and 8B, except that the former backlight unit further includes third light sources in addition to the first and second light sources on the printed circuit board.

Therefore, in order to avoid duplicated description, the configuration of the backlight unit of FIGS. 10A and 10B different from that of the preceding embodiment will be mainly described. Parts not specifically described in this embodiment may remain the same as the preceding embodiment, wherein the same numerals denote the same components and similar numbers denote similar components (although minor modifications may be made consistent with the embodiment described in FIGS. 10A and 10B).

Referring to FIGS. 1, 10A, and 10B, the backlight unit 300 includes the light emitting array 350, the light guide film 310, the color conversion layer 320, the reflection sheet 340, and the optical member 330.

The light emitting array 350 may include the plurality of light sources 351, and the printed circuit board 352 on which the light sources 351 may be mounted.

According to an embodiment of the present disclosure, the light sources 351 may include the plurality of first light sources 351a, the plurality of second light sources 351b, and a plurality of third light sources 351c, which may emit a single color of light (e.g., blue light). The first to third light sources 351a, 351b and 351c may have the same size. For instance, the first to third light sources 351a, 351b and 351c may have a size of 300 μm or less. In another example, the backlight unit 300 may include micro-scale light sources 351 each having a size of less than one-third the thickness of the light guide film 310. That is, the light sources 351 may be small enough so that three or more rows of light sources 351 may be arranged without exceeding the thickness of the light guide film 310.

The first light sources 351a extend in the first direction DR1 to form the first light emitting row R1. Each of the first light sources 351a in the first light emitting row R1 may be arranged on the printed circuit board 352 to be spaced apart from an adjacent first light source 351a by a first distance d1. The first distance d1 may be the same as a horizontal width of each of the first light sources 351a.

The second light sources 351b extend in the first direction DR1 to form the second light emitting row R2. Each of the second light sources 351b in the second light emitting row R2 may be arranged on the printed circuit board 352 to be spaced apart from an adjacent second light source 351b by the first distance d1.

The third light sources 351c extend in the first direction DR1 to form a third light emitting row R3. Each of the third light sources 351c in the third light emitting row R3 may be arranged on the printed circuit board 352 to be spaced apart from an adjacent third light source 351c by the first distance d1.

According to an embodiment of the present disclosure, the first light sources 351a and the third light sources 351c may be arranged on the same columns in the second direction DR2 crossing the first direction DR1. Each first light source 351a and third light source 351c that are adjacent to each other in the second direction DR2 may be arranged on the same column of the printed circuit board 352 to be spaced apart from each other by a second distance d2. The second distance d2 may be the same as the vertical width of the second light source 351b. The vertical width means a width extending in the second direction DR2 on the one second light source 351b.

The second light sources 351b may be arranged on a column different from the first and third light sources 351a and 351c in the second direction DR2. For example, the first and third light sources 351a and 351c may be arranged in an odd-numbered column on the printed circuit board 352, and the second light sources 351b may be arranged in an even-numbered column on the printed circuit board 352.

The light emitting array 350 may include a unit light emitting area UEM formed by combining at least one first light source 351a, at least one second light source 351b and at least one third light source 351c arranged in different light emitting rows. A plurality of unit light emitting areas UEM may be provided on the light emitting array 350.

According to an embodiment of the present disclosure, one first light source 351a (hereinafter, referred to as a '1-1 light source') arranged on the first column C1 of the first light emitting row R1, one first light source 351a (hereinafter, referred to as a '1-2 light source') arranged on the third column C3 of the first light emitting row R1, one second light source 351b (hereinafter, referred to as a '2-1 light source') arranged on the second column C2 of the second light emitting row R2, one second light source 351b (hereinafter, referred to as a '2-2 light source') arranged on the fourth column C4 of the second light emitting row R2, one third light source 351c (hereinafter, referred to as a '3-1 light source') arranged on the first column C1 of the third light emitting row R3, and one third light source 351c (hereinafter, referred to as a '3-2 light source') arranged on the third column C3 of the third light emitting row R3 may constitute one unit light emitting area UEM.

A line unit connected to the light sources 351 may be provided on the printed circuit board 352. The line unit may include first to third lines 353, 354 and 355.

According to an embodiment of the present disclosure, the first line 353 may be a first power supply line that may electrically connect an external power supply unit (not shown) with the light sources 351 to supply light-source drive voltage of the power supply unit to the light sources 351. The second line 354 may be an interconnection line electrically connecting the light sources 351 included in the unit light emitting area UEM. The third line 355 may be a second power supply line to which ground voltage may be supplied.

According to an embodiment of the present disclosure, the 1-1 light source 351a included in the unit light emitting area UEM may be electrically connected to the first line 353, and the 2-2 light source 351b may be electrically connected to the third line 355.

The 1-1 light source 351a may be electrically connected through the second line 354 to the 1-2 light source 351a, the 1-2 light source 351a may be connected through the second line 354 to the 2-1 light source 351b, the 2-1 light source 351b may be connected through the second line 354 to the 3-1 light source 351c, the 3-1 light source 351c may be connected through the second line 354 to the 3-2 light source 351c, and the 3-2 light source 351c may be connected through the second line 354 to the 2-2 light source 351b.

Hence, the light-source drive voltage transmitted to the 1-1 light source 351a may be transmitted in order to the 1-2 light source 351a, the 2-1 light source 351b, the 3-1 light source 351c, the 3-2 light source 351c, and the 2-2 light source 351b. Thus, the light sources 351 included in the unit light emitting area UEM may be driven, respectively, to emit the blue light.

According to an embodiment of the present disclosure, the first light sources 351a included in the unit light emitting area UEM may be arranged on odd-numbered columns (e.g., columns C1 and C3) in the unit light emitting area UEM, the second light sources 351b included in the unit light emitting area UEM may be arranged on even-numbered columns (e.g., columns C2 and C4) in the unit light emitting area UEM, and the third light sources 351c included in the unit light emitting area UEM may be arranged on odd-numbered columns (e.g., columns C1 and C3). In other words, the first light sources 351a and the third light sources 351c included in the unit light emitting area UEM may be arranged on the printed circuit board 352 in the same columns, and the second light sources 351b may be arranged on the printed circuit board 352 in columns different from the first and third light sources 351a and 351c.

Figure 11A:
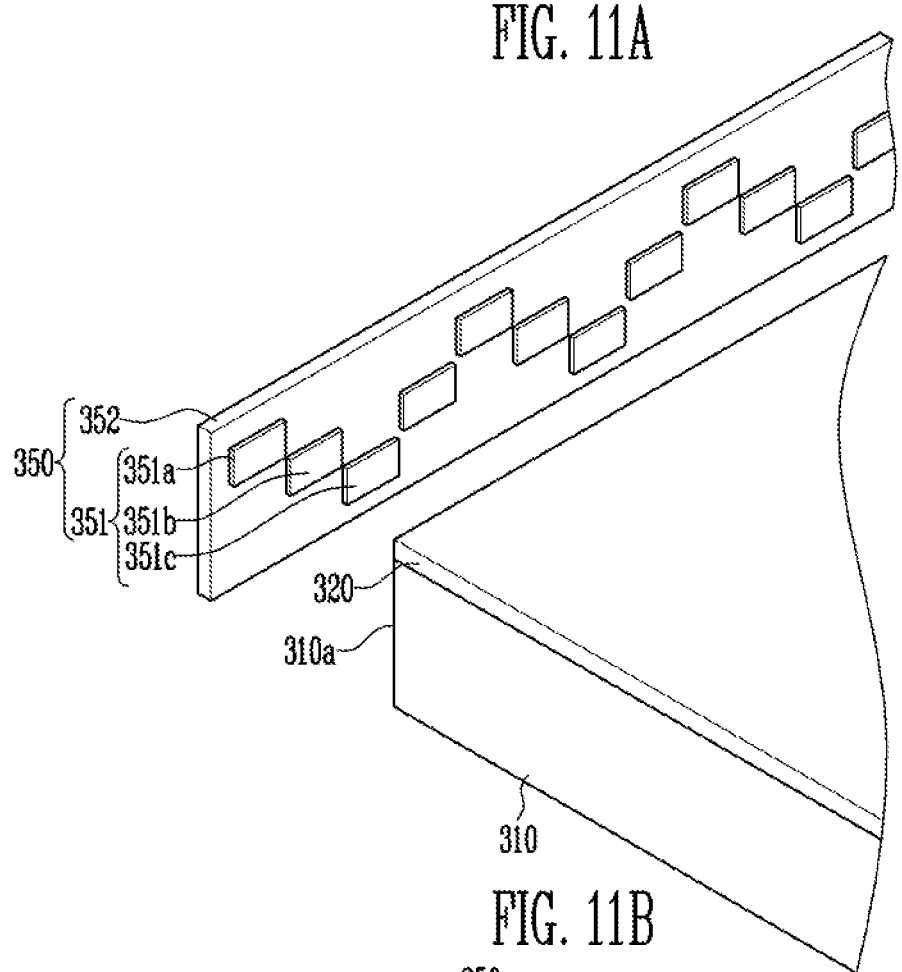
FIG. 11A is a partially enlarged perspective view illustrating a part of a backlight unit including a light emitting array according to a further embodiment.
Figure 11B:
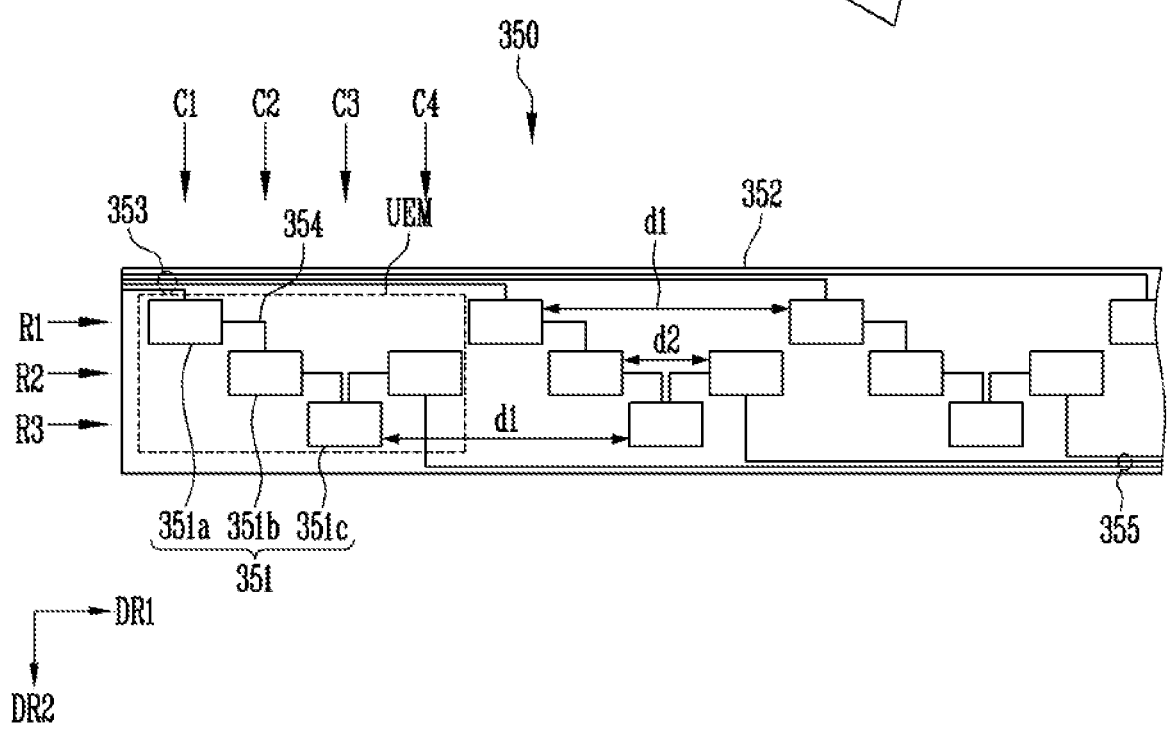
FIG. 11B is a plan view schematically illustrating the light emitting array of FIG. 11A according to an embodiment of the present disclosure.

FIG. 11A is a partially enlarged perspective view illustrating a part of a backlight unit including a light emitting array according to a further embodiment, and FIG. 11B is a plan view schematically illustrating the light emitting array of FIG. 11A according to an embodiment of the present disclosure.

The backlight unit illustrated in FIGS. 11A and 11B may have a configuration substantially the same as or similar to the backlight unit of FIGS. 10A and 10B, except for the arrangement of the first to third light sources mounted on the printed circuit board.

Therefore, in order to avoid duplicated description, the configuration of the backlight unit of FIGS. 11A and 11B different from that of the preceding embodiment will be mainly described. Parts not specifically described in this embodiment remain the same as the preceding embodiment, wherein the same numerals denote the same components and similar numbers denote similar components.

Referring to FIGS. 1, 11A, and 11B, the backlight unit 300 includes the light emitting array 350, the light guide film 310, the color conversion layer 320, the reflection sheet 340, and the optical member 330.

The light emitting array 350 may include the plurality of light sources 351, and the printed circuit board 352 on which the light sources 351 may be mounted.

According to an embodiment of the present disclosure, the light sources 351 may include the plurality of first light sources 351a, the plurality of second light sources 351b, and a plurality of third light sources 351c, each of which may emit blue light. The first to third light sources 351a, 351b and 351c may have the same size. For instance, the first to third light sources 351a, 351b and 351c may have a size of 300 μm or less.

The first light sources 351a extend in the first direction DR1 to form the first light emitting row R1. Each of the first light sources 351a in the first light emitting row R1 may be arranged on the printed circuit board 352 to be spaced apart from an adjacent first light source 351a by a first distance d1. The first distance d1 may be at least three times a horizontal width of each of the first light sources 351a.

The second light sources 351b extend in the first direction DR1 to form the second light emitting row R2. Each of the second light sources 351b in the second light emitting row R2 may be arranged on the printed circuit board 352 to be spaced apart from an adjacent second light source 351b by a second distance d2. Here, the second distance d2 may be the same as the horizontal width of each of the second light sources 351b.

The third light sources 351c extend in the first direction DR1 to form a third light emitting row R3. Each of the third light sources 351c in the third light emitting row R3 may be arranged on the printed circuit board 352 to be spaced apart from an adjacent third light source 351c by the first distance d1.

According to an embodiment of the present disclosure, the first to third light sources 351a, 351b and 351c may be alternately arranged in the second direction DR2 crossing the first direction DR1.

The light emitting array 350 may include a unit light emitting area UEM formed by combining at least one first light source 351a, at least one second light source 351b and at least one third light source 351c arranged in different light emitting rows. A plurality of unit light emitting areas UEM may be provided on the light emitting array 350.

According to an embodiment of the present disclosure, one first light source 351a (hereinafter, referred to as a '1-1 light source') arranged on the first column C1 of the first light emitting row R1, one second light source 351b (hereinafter, referred to as a '2-1 light source') arranged on the second column C2 of the second light emitting row R2, one second light source 351b (hereinafter, referred to as a '2-2 light source') arranged on the fourth column C4 of the second light emitting row R2, and one third light source 351c (hereinafter, referred to as a '3-1 light source') arranged on the third column C3 of the third light emitting row R3 may constitute one unit light emitting area UEM.

A line unit connected to the light sources 351 may be provided on the printed circuit board 352. The line unit may include first to third lines 353, 354 and 355.

The first line 353 may be a first power supply line that may electrically connect an external power supply unit (not shown) with the light sources 351 to supply light-source drive voltage of the power supply unit to the light sources 351. The second line 354 may be an interconnection line electrically connecting the light sources 351 included in the unit light emitting area UEM. The third line 355 may be a second power supply line to which ground voltage may be supplied.

According to an embodiment of the present disclosure, the 1-1 light source 351a included in the unit light emitting area UEM may be electrically connected to the first line 353, and the 2-2 light source 351b may be electrically connected to the third line 355.

The 1-1 light source 351a may be electrically connected through the second line 354 to the 2-1 light source 351b, the 2-1 light source 351b may be connected through the second line 354 to the 3-1 light source 351c, and the 3-1 light source 351c may be connected through the second line 354 to the 2-2 light source 351b.

Hence, the light-source drive voltage transmitted to the 1-1 light source 351a may be transmitted in order to the 2-1 light source 351b, the 3-1 light source 351c, and the 2-2 light source 351b. Thus, the light sources 351 included in the unit light emitting area UEM may be driven, respectively, to emit the blue light.

Figure 12A:
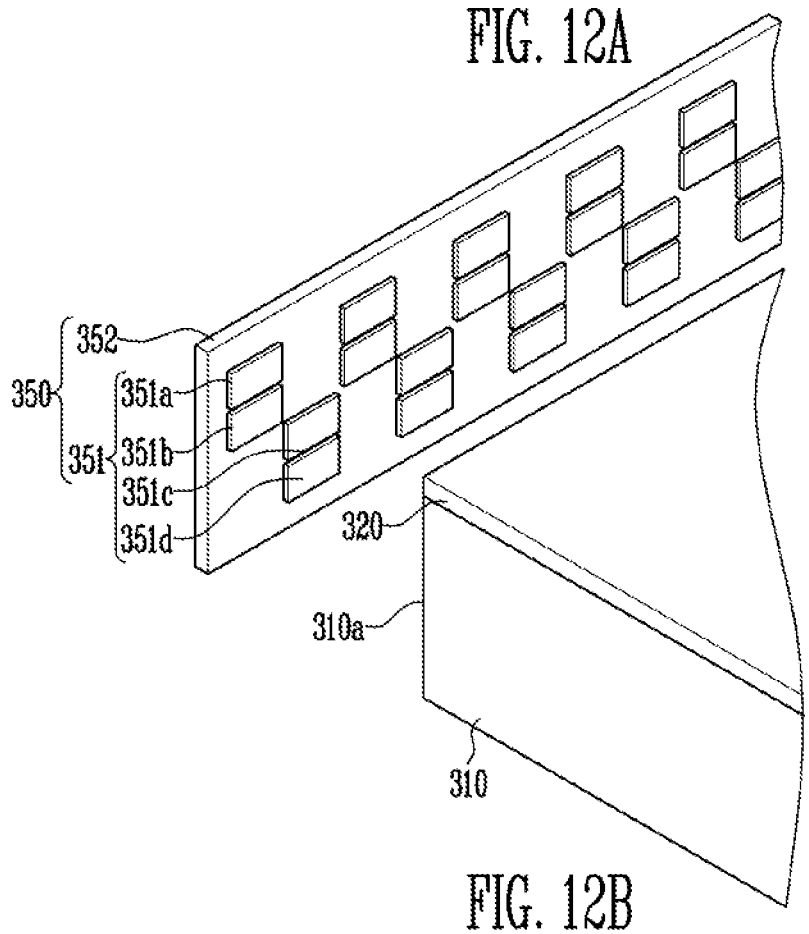
FIG. 12A is a partially enlarged perspective view illustrating a part of a backlight unit including a light emitting array according to a still another embodiment.
Figure 12B:
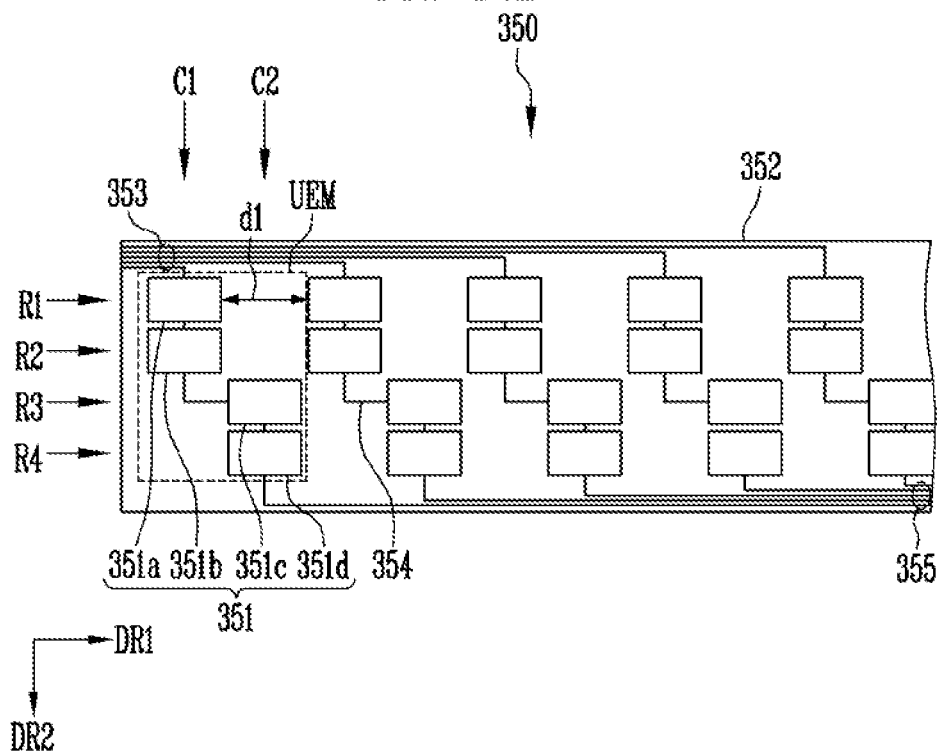
FIG. 12B is a plan view schematically illustrating the light emitting array of FIG. 12A according to an embodiment of the present disclosure.

FIG. 12A is a partially enlarged perspective view illustrating a part of a backlight unit including a light emitting array according to a still another embodiment, and FIG. 12B is a plan view schematically illustrating the light emitting array of FIG. 12A according to an embodiment of the present disclosure.

The backlight unit illustrated in FIGS. 12A and 12B may have a configuration substantially the same as or similar to the backlight unit of FIGS. 11A and 11B, except that the backlight unit illustrated in FIGS. 12A and 12B further includes fourth light sources in addition to the first to third light sources on the printed circuit board. Accordingly, the arrangement of the light sources may also differ from that described in reference to FIGS. 11A and 11B.

Therefore, in order to avoid duplicated description, the configuration of the backlight unit of FIGS. 12A and 12B different from that of the preceding embodiment will be mainly described. Parts not specifically described in this embodiment remain the same as the preceding embodiment, wherein the same numerals denote the same components and similar numbers denote similar components.

Referring to FIGS. 1, 12A, and 12B, the backlight unit 300 includes the light emitting array 350, the light guide film 310, the color conversion layer 320, the reflection sheet 340, and the optical member 330.

The light emitting array 350 may include the plurality of light sources 351, and the printed circuit board 352 on which the light sources 351 may be mounted.

According to an embodiment of the present disclosure, the light sources 351 may include the plurality of first light sources 351a, the plurality of second light sources 351b, the plurality of third light sources 351c, and a plurality of fourth light sources 351d, which emit blue light. The first to fourth light sources 351a, 351b, 351c and 351d may have the same size. For instance, the first to fourth light sources 351a, 351b, 351c and 351d may have a size of 300 μm or less. In another example, the backlight unit 300 may include micro-scale light sources 351 each having a size of less than one-fourth the thickness of the light guide film 310. That is, the light sources 351 may be small enough so that four or more rows of light sources 351 may be arranged without exceeding the thickness of the light guide film 310.

The first light sources 351a extend in the first direction DR1 to form the first light emitting row R1. Each of the first light sources 351a in the first light emitting row R1 may be arranged on the printed circuit board 352 to be spaced apart from an adjacent first light source 351a by a first distance d1. The first distance d1 may be the same as a horizontal width of each of the first light sources 351a.

The second light sources 351b extend in the first direction DR1 to form the second light emitting row R2. Each of the second light sources 351b in the second light emitting row R2 may be arranged on the printed circuit board 352 to be spaced apart from an adjacent second light source 351b by the first distance d1.

The third light sources 351c extend in the first direction DR1 to form a third light emitting row R3. Each of the third light sources 351c in the third light emitting row R3 may be arranged on the printed circuit board 352 to be spaced apart from an adjacent third light source 351c by the first distance d1.

The fourth light sources 351d extend in the first direction DR1 to form a fourth light emitting row R4. Each of the fourth light sources 351d in the fourth light emitting row R4 may be arranged on the printed circuit board 352 to be spaced apart from an adjacent fourth light source 351d by the first distance d1.

According to an embodiment of the present disclosure, the first light sources 351a and the second light sources 351b may be arranged on the same column in the second direction DR2 crossing the first direction DR1. The third light sources 351c and the fourth light sources 351d may be arranged on the same column in the second direction DR2.

The third and fourth light sources 351c and 351d may be arranged on a column different from the first and second light sources 351a and 351b in the second direction DR2. For example, the first and second light sources 351a and 351b may be arranged in an odd-numbered column on the printed circuit board 352, and the third and fourth light sources 351c and 351d may be arranged in an even-numbered column on the printed circuit board 352.

The light emitting array 350 may include a unit light emitting area UEM formed by combining at least one first light source 351a, at least one second light source 351b, at least one third light source 351c, and at least one fourth light source 351d arranged in different light emitting rows. A plurality of unit light emitting areas UEM may be provided on the light emitting array 350.

According to an embodiment of the present disclosure, one first light source 351a (hereinafter, referred to as a '1-1 light source') arranged on the first column C1 of the first light emitting row R1, one second light source 351b (hereinafter, referred to as a '2-1 light source') arranged on the first column C1 of the second light emitting row R2, one third light source 351c (hereinafter, referred to as a '3-1 light source') arranged on the second column C2 of the third light emitting row R3, and one fourth light source 351d (hereinafter, referred to as a '4-1 light source') arranged on the second column C2 of the fourth light emitting row R4 may constitute one unit light emitting area UEM.

A line unit connected to the light sources 351 may be provided on the printed circuit board 352. The line unit may include first to third lines 353, 354 and 355.

The first line 353 may be a first power supply line that may electrically connect an external power supply unit (not shown) with the light sources 351 to supply light-source drive voltage of the power supply unit to the light sources 351. The second line 354 may be an interconnection line electrically connecting the light sources 351 included in the unit light emitting area UEM. The third line 355 may be a second power supply line to which ground voltage may be supplied.

According to an embodiment of the present disclosure, the 1-1 light source 351a included in the unit light emitting area UEM may be electrically connected to the first line 353, and the 4-1 light source 351d may be electrically connected to the third line 355.

The 1-1 light source 351a may be electrically connected through the second line 354 to the 2-1 light source 351b, the 2-1 light source 351b may be connected through the second line 354 to the 3-1 light source 351c, and the 3-1 light source 351c may be connected through the second line 354 to the 4-1 light source 351d.

Hence, the light-source drive voltage transmitted to the 1-1 light source 351a may be transmitted in order to the 2-1 light source 351b, the 3-1 light source 351c, and the 4-1 light source 351d. Thus, the light sources 351 included in the unit light emitting area UEM may be driven, respectively, to emit the blue light.

Figure 13A:
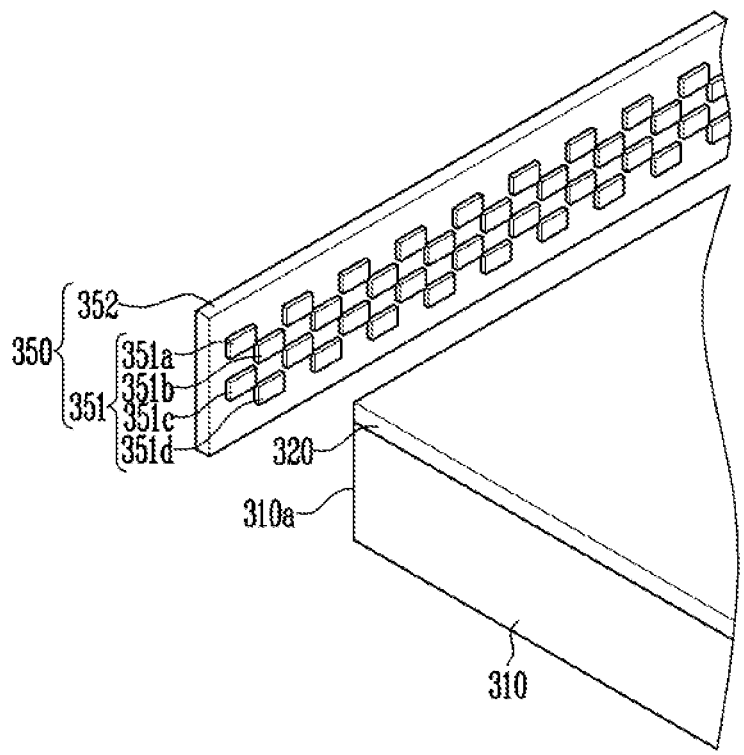
FIG. 13A is a partially enlarged perspective view illustrating a part of a backlight unit including a light emitting array according to yet another embodiment.
Figure 13B:
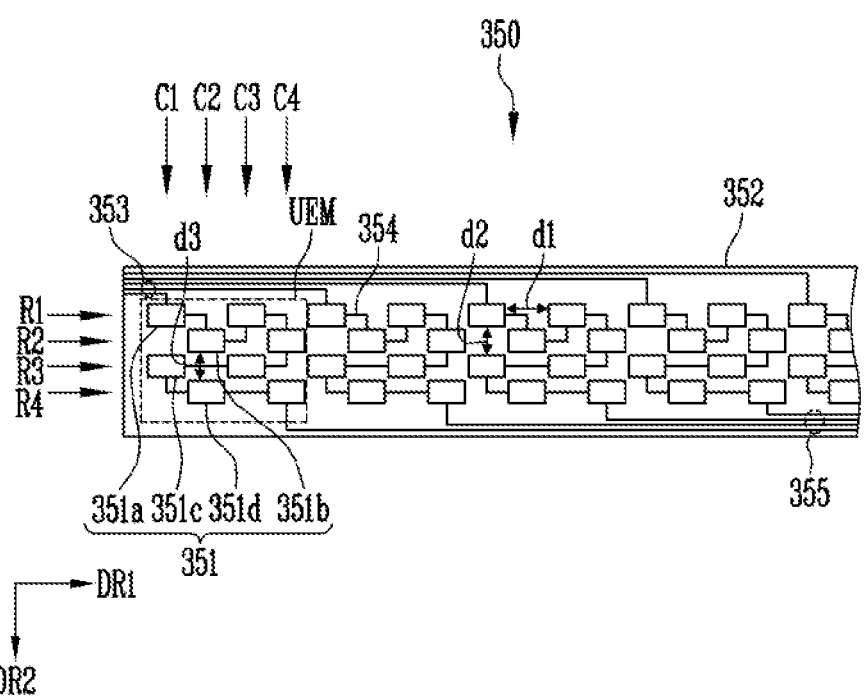
FIG. 13B is a plan view schematically illustrating the light emitting array of FIG. 13A according to an embodiment of the present disclosure.

FIG. 13A is a partially enlarged perspective view illustrating a part of a backlight unit including a light emitting array according to yet another embodiment, and FIG. 13B is a plan view schematically illustrating the light emitting array of FIG. 13A according to an embodiment of the present disclosure.

The backlight unit illustrated in FIGS. 13A and 13B may have a configuration substantially the same as or similar to the backlight unit of FIGS. 12A and 12B, except that light sources mounted on the printed circuit board have a size of about 100. Accordingly, the arrangement of the light sources may be different from that described in reference to FIGS. 12A and 12B.

Therefore, in order to avoid duplicated description, the configuration of the backlight unit of FIGS. 13A and 13B different from that of the preceding embodiment will be mainly described. Parts not specifically described in this embodiment remain the same as the preceding embodiment, wherein the same numerals denote the same components and similar numbers denote similar components.

Referring to FIGS. 1, 13A, and 13B, the backlight unit 300 includes the light emitting array 350, the light guide film 310, the color conversion layer 320, the reflection sheet 340, and the optical member 330.

The light emitting array 350 may include the plurality of light sources 351, and the printed circuit board 352 on which the light sources 351 may be mounted.

According to an embodiment of the present disclosure, the light sources 351 may include the plurality of first light sources 351a, the plurality of second light sources 351b, the plurality of third light sources 351c, and the plurality of fourth light sources 351d, which emit blue light. The first to fourth light sources 351a, 351b, 351c and 351d may have the same size. The first to fourth light sources 351a, 351b, 351c and 351d may have a micro-scale light-emitting diode with a size of 100 μm or less. Since the first to fourth light sources 351a, 351b, 351c and 351d have a size of 100 rpm or less, a larger number of light sources 351 may be mounted on the printed circuit board 352. In this case, it is possible to increase the intensity of light emitted from the light emitting array 350.

The first light sources 351a extend in the first direction DR1 to form the first light emitting row R1. Each of the first light sources 351a in the first light emitting row R1 may be arranged on the printed circuit board 352 to be spaced apart from an adjacent first light source 351a by a first distance d1. The first distance d1 may be the same as a horizontal width of each of the first light sources 351a. The first distance d1 may be 100 μm or less.

The second light sources 351b extend in the first direction DR1 to form the second light emitting row R2. Each of the second light sources 351b in the second light emitting row R2 may be arranged on the printed circuit board 352 to be spaced apart from an adjacent second light source 351b by the first distance d1.

The third light sources 351c extend in the first direction DR1 to form a third light emitting row R3. Each of the third light sources 351c in the third light emitting row R3 may be arranged on the printed circuit board 352 to be spaced apart from an adjacent third light source 351c by the first distance d1.

The fourth light sources 351d extend in the first direction DR1 to form a fourth light emitting row R4. Each of the fourth light sources 351d in the fourth light emitting row R4 may be arranged on the printed circuit board 352 to be spaced apart from an adjacent fourth light source 351d by the first distance d1.

According to an embodiment of the present disclosure, the first light sources 351a and the third light sources 351c may be arranged on the same column in the second direction DR2 crossing the first direction DR1. One first light source 351a and one third light source 351c adjacent to each other in the second direction DR2 may be arranged on the same column of the printed circuit board 352 to be spaced apart from each other by a second distance d2. The second distance d2 may be the same as the vertical width of the one second light source 351b. The vertical width means a width extending in the second direction DR2 on the one second light source 351b.

The second light sources 351b and the fourth light sources 351d may be arranged on the same column in the second direction DR2. One second light source 351b and one fourth light source 351d adjacent to each other in the second direction DR2 may be arranged on the same column of the printed circuit board 352 to be spaced apart from each other by a third distance d3. The third distance d3 may be the same as the vertical width of the one third light source 351c. The vertical width means a width extending in the second direction DR2 on the one third light source 351c. According to an embodiment of the present disclosure, the second distance d2 may be equal to the third distance d3, which may be approximately 100 μm or less.

The second and fourth light sources 351b and 351d may be arranged on a column different from the first and third light sources 351a and 351c in the second direction DR2. For example, the first and third light sources 351a and 351c may be arranged in an odd-numbered column on the printed circuit board 352, and the second and fourth light sources 351b and 351d may be arranged in an even-numbered column on the printed circuit board 352.

The light emitting array 350 may include a unit light emitting area UEM formed by combining at least one first light source 351a, at least one second light source 351b, at least one third light source 351c, and at least one fourth light source 351d arranged in different light emitting rows. A plurality of unit light emitting areas UEM may be provided on the light emitting array 350.

According to an embodiment of the present disclosure, one first light source 351a (hereinafter, referred to as a '1-1 light source') arranged on the first column C1 of the first light emitting row R1, one first light source 351a (hereinafter, referred to as a '1-2 light source') arranged on the third column C3 of the first light emitting row R1, one second light source 351b (hereinafter, referred to as a '2-1 light source') arranged on the second column C2 of the second light emitting row R2, one second light source 351b (hereinafter, referred to as a '2-2 light source') arranged on the fourth column C4 of the second light emitting row R2, one third light source 351c (hereinafter, referred to as a '3-1 light source') arranged on the first column C1 of the third light emitting row R3, one third light source 351c (hereinafter, referred to as a '3-2 light source') arranged on the third column C3 of the third light emitting row R3, one fourth light source 351d (hereinafter, referred to as a '4-1 light source') arranged on the second column C2 of the fourth light emitting row R4, and one fourth light source 351d (hereinafter, referred to as a '4-2 light source') arranged on the fourth column C4 of the fourth light emitting row R4 may constitute one unit light emitting area UEM.

A line unit connected to the light sources 351 may be provided on the printed circuit board 352. The line unit may include first to third lines 353, 354 and 355.

According to an embodiment of the present disclosure, the first line 353 may be a first power supply line that may electrically connect an external power supply unit (not shown) with the light sources 351 to supply light-source drive voltage of the power supply unit to the light sources 351. The second line 354 may be an interconnection line electrically connecting the light sources 351 included in the unit light emitting area UEM. The third line 355 may be a second power supply line to which ground voltage may be supplied.

According to an embodiment of the present disclosure, the 1-1 light source 351a included in the unit light emitting area UEM may be electrically connected to the first line 353, and the 4-2 light source 351d may be electrically connected to the third line 355.

The 1-1 light source 351a may be electrically connected through the second line 354 to the 2-1 light source 351b, the 2-1 light source 351b may be connected through the second line 354 to the 1-2 light source 351a, the 1-2 light source 351a may be connected through the second line 354 to the 2-2 light source 351b, the 2-2 light source 351b may be connected through the second line 354 to the 3-2 light source 351c, the 3-2 light source 351c may be connected through the second line 354 to the 3-1 light source 351c, the 3-1 light source 351c may be connected through the second line 354 to the 4-1 light source 351d, and the 4-1 light source 351d may be connected through the second line 354 to the 4-2 light source 351d.

Hence, the light-source drive voltage transmitted to the 1-1 light source 351a may be transmitted in order to the 2-1 light source 351b, the 1-2 light source 351a, the 2-2 light source 351b, the 3-2 light source 351c, the 3-1 light source 351c, the 4-1 light source 351d, and the 4-2 light source 351d. Thus, the light sources 351 included in the unit light emitting area UEM may be driven, respectively, to emit the blue light.

According to an embodiment of the present disclosure, the first light sources 351a included in the unit light emitting area UEM may be arranged on the odd-numbered columns (e.g., columns C1 and C3) in the unit light emitting area UEM, and the second light sources 351b included in the unit light emitting area UEM may be arranged on the even-numbered columns (e.g., columns C2 and C4) in the unit light emitting area UEM. Further, the third light sources 351c included in the unit light emitting area UEM may be arranged on the odd-numbered columns (e.g., columns C1 and C3), and the fourth light sources 351d included in the unit light emitting area UEM may be arranged on the even-numbered columns (e.g., columns C2 and C4) in the unit light emitting area UEM.

That is, the first light sources 351a and the third light sources 351c included in the unit light emitting area UEM may be arranged on the same column on the printed circuit board 352, while the second light sources 351b and the fourth light sources 351d may be arranged on a column different from the first and third light sources 351a and 351c on the printed circuit board 352.

The display device according to an embodiment of the present disclosure may be employed in various electronic devices. For example, the display device may be applied to a television, a laptop computer, a mobile phone, a smart phone, a smart pad (PD), a PMP, a PDA, a navigation device, and various wearable devices such as a smart watch.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A backlight unit comprising:
a light emitting array including a plurality of light sources configured to emit light, and a printed circuit board on which the light sources are arranged;
a light guide film configured to guide light emitted from the light sources in one direction;
a color conversion layer disposed on a surface of the light guide film, the color conversion layer configured to convert light that has passed through the light guide film into light of a specific color; and
an optical member disposed on the color conversion layer,
wherein the light sources are arranged at locations of a grid pattern on the printed circuit board perpendicular to the surface of the light guide film, wherein the grid pattern comprises a plurality of columns and a plurality of rows, wherein the light sources comprise a plurality of first light sources arranged on a first row of the grid pattern and a plurality of second light sources arranged on a second row of the grid pattern, wherein each of the plurality of first light sources is located within a column of the grid pattern that does not include any of the plurality of second light sources, and wherein each of the plurality of first light sources comprises a bottom corner that is adjacent to a top corner of a light source from the plurality of second light sources within a different column of the grid pattern,
wherein the light emitting array comprises a plurality of unit light emitting areas each including at least one first light source of the first light sources and at least one second light source of the second light sources, and
wherein the at least one first light source and the at least one second light source included in each of the unit light emitting areas are electrically connected to each other via an interconnection line arranged on the printed circuit board.

2. The backlight unit according to claim 1, wherein the first light sources and the second light sources comprises a same type of light source.

3. The backlight unit according to claim 2, wherein the first light sources and the second light sources are alternately arranged on the printed circuit board.

4. The backlight unit according to claim 1, wherein the color conversion layer comprises:
a light conversion layer containing a plurality of light conversion particles therein;
a first protective layer disposed between the light conversion layer and the light guide film; and
a second protective layer disposed between the light conversion layer and the optical member.

5. The backlight unit according to claim 4, wherein the light conversion particles comprise a quantum dot.

6. The backlight unit according to claim 1, wherein the light sources further comprise a plurality of third light sources arranged on a third row of the grid pattern.

7. The backlight unit according to claim 6, wherein the first light sources and the third light sources are arranged on a same column of the grid pattern.

8. The backlight unit according to claim 6, wherein the first light sources, the second light sources, and the third light sources are arranged on different columns of the grid pattern.

9. The backlight unit according to claim 6, wherein the first light sources, the second light sources, and the third light sources are alternately arranged on different columns of the grid pattern.

10. The backlight unit according to claim 6, wherein the light sources further comprise a plurality of fourth light sources arranged on a fourth row of the grid pattern.

11. The backlight unit according to claim 1, wherein each of the first light sources and each of the second light sources comprise a height in a vertical direction perpendicular to a surface of the light guide film that is less than half of a thickness of the light guide film.

12. The backlight unit according to claim 10, wherein the first light sources and the third light sources are arranged on a same first column, and the second light sources and the fourth light sources are arranged on a same second column.

13. The backlight unit according to claim 1, wherein each of the first light sources and second light sources comprises a micro-scale light emitting element having a size of about 300 µm or less, and wherein the light emitting element comprises a light-emitting diode configured to emit blue light.

14. A backlight unit comprising:
a light emitting array including a plurality of light sources configured to emit light, and a printed circuit board on which the light sources are arranged;
a light guide film configured to guide light emitted from the light sources in one direction;
a color conversion layer disposed on a surface of the light guide film, the color conversion layer configured to convert light that has passed through the light guide film into light of a specific color; and
an optical member disposed on the color conversion layer,
wherein the light sources are arranged at locations of a grid pattern on the printed circuit board perpendicular to the surface of the light guide film, wherein the grid pattern comprises a plurality of columns and a plurality of rows, wherein the light sources comprise a plurality of first light sources arranged on a first row of the grid pattern and a plurality of second light sources arranged on a second row of the grid pattern, wherein each of the plurality of first light sources is located within a column of the grid pattern that does not include any of the plurality of second light sources, and wherein each of the plurality of first light sources comprises a bottom corner that is adjacent to a top corner of a light source from the plurality of second light sources within a different column of the grid pattern,
wherein the first light sources are spaced apart from each other in different columns of the grid pattern by a predetermined distance equal to a width of the light sources,
wherein the light emitting array comprises a plurality of unit light emitting areas each including at least one first light source of the first light sources and at least one second light source of the second light sources, and
wherein the at least one first light source and the at least one second light source included in each of the unit light emitting areas are electrically connected to each other via an interconnection line arranged on the printed circuit board.

15. The backlight unit according to claim 14, wherein the first light sources are spaced apart from each other by the predetermined distance, the second light sources are spaced apart from each other by the predetermined distance, and the second light sources are offset from the first light sources by the predetermined distance.

16. A backlight unit comprising:
a light emitting array including a plurality of light sources configured to emit light, and a printed circuit board on which the light sources are arranged;
a light guide film configured to guide light emitted from the light sources in one direction;
a color conversion layer disposed on a surface of the light guide film, the color conversion layer configured to convert light that has passed through the light guide film into light of a specific color; and
an optical member disposed on the color conversion layer,
wherein the light sources are arranged at locations of a grid pattern on the printed circuit board perpendicular to the surface of the light guide film, wherein the grid pattern comprises a plurality of columns and a plurality of rows, wherein the light sources comprise a plurality of first light sources arranged on a first row of the grid pattern and a plurality of second light sources arranged on a second row of the grid pattern, wherein each of the plurality of first light sources is located within a column of the grid pattern that does not include any of the plurality of second light sources, and wherein each of the plurality of first light sources comprises a bottom corner that is adjacent to a top corner of a light source from the plurality of second light sources within a different column of the grid pattern,
wherein each of the first light sources and each of the second light sources comprise a same type of light source emitting blue light,
wherein each of the first light sources and the second light sources comprises a height in a vertical direction perpendicular to a surface of the light guide film that is less than half of a thickness of the light guide film,
wherein the light emitting array comprises a plurality of unit light emitting areas each including at least one first light source of the first light sources and at least one second light source of the second light sources, and
wherein the at least one first light source and the at least one second light source included in each of the unit light emitting areas are electrically connected to each other via an interconnection line arranged on the printed circuit board.

17. The backlight unit according to claim 16, wherein the first light sources are spaced apart from each other by a predetermined distance, the second light sources are spaced apart from each other by the predetermined distance, and the second light sources are offset from the first light sources by the predetermined distance.

* * * * *